(12) United States Patent
Tsai et al.

(10) Patent No.: US 11,752,707 B2
(45) Date of Patent: Sep. 12, 2023

(54) OCTOGRID CONSTRUCTIONS AND APPLICATIONS UTILIZING DOUBLE-DOUBLE LAMINATE STRUCTURES

(71) Applicant: The Board of Trustees of the Leland Stanford Junior University, Stanford, CA (US)

(72) Inventors: Stephen W. Tsai, Honolulu, HI (US); Chuanxiang Zheng, Hangzhou (CN); Surajit Roy, Long Beach, CA (US)

(73) Assignee: THE BOARD OF TRUSTEES OF THE LELAND STANFORD JUNIOR UNIVERSITY, Stanford, CA (US)

( * ) Notice: Subject to any disclaimer, the term of this patent is extended or adjusted under 35 U.S.C. 154(b) by 0 days.

(21) Appl. No.: 17/743,624

(22) Filed: May 13, 2022

(65) Prior Publication Data
US 2022/0363019 A1  Nov. 17, 2022

Related U.S. Application Data

(60) Provisional application No. 63/188,206, filed on May 13, 2021.

(51) Int. Cl.
| | |
|---|---|
| *B32B 3/14* | (2006.01) |
| *B29C 70/30* | (2006.01) |
| *F03D 1/06* | (2006.01) |
| *B64C 11/26* | (2006.01) |
| *B29L 31/08* | (2006.01) |

(52) U.S. Cl.
CPC ............ *B29C 70/304* (2021.05); *B64C 11/26* (2013.01); *F03D 1/0675* (2013.01);
(Continued)

(58) Field of Classification Search
None
See application file for complete search history.

(56) References Cited

U.S. PATENT DOCUMENTS

| | | | |
|---|---|---|---|
| 4,012,549 A | 3/1977 | Slysh | |
| 4,063,981 A | 12/1977 | Rhodes et al. | |

(Continued)

FOREIGN PATENT DOCUMENTS

| | | |
|---|---|---|
| CN | 105196583 A | 12/2015 |
| EP | 2772351 A1 | 9/2014 |

(Continued)

OTHER PUBLICATIONS

Akbulut, et al., "Optimum design of composit laminates for minimum thickness," computer and Structures, 86, 1974-1982, (2008).

(Continued)

*Primary Examiner* — Alexander S Thomas
(74) *Attorney, Agent, or Firm* — Alston & Bird LLP

(57) ABSTRACT

An octogrid structure and method of forming the same for a composite laminate structure is provided. The octogrid substructure comprises: a first ply layer comprising a plurality of first elongate tapes oriented in a first direction and a plurality of second elongate tapes oriented in a second direction; and a second ply layer comprising a plurality of third elongate tapes oriented in the first direction and a plurality of fourth elongate tapes oriented in the second direction, the second ply layer being overlaid atop the first ply layer. A first end of each of the elongate tapes is positioned approximately adjacent a midpoint of an adjacently positioned one of the elongate tapes; and a second and opposing end of each of elongate tapes extends freely beyond a central grid portion defined by a length of a portion between the first end and the midpoint of the elongate tapes.

20 Claims, 18 Drawing Sheets

(52) U.S. Cl.
CPC . *B29K 2995/0094* (2013.01); *B29L 2031/085* (2013.01); *B32B 3/14* (2013.01); *F05B 2230/60* (2013.01)

(56) References Cited

U.S. PATENT DOCUMENTS

| | | | |
|---|---|---|---|
| 5,429,845 | A | 7/1995 | Newhouse et al. |
| 5,476,189 | A | 12/1995 | Duvall et al. |
| 6,050,315 | A | 4/2000 | Deckers et al. |
| 9,296,174 | B2 | 3/2016 | Tsai et al. |
| 2006/0093802 | A1 | 5/2006 | Tsai et al. |
| 2006/0116040 | A1 | 6/2006 | Yun et al. |
| 2007/0187024 | A1 | 8/2007 | Johnson et al. |
| 2012/0100343 | A1 | 4/2012 | Borghini-Lilli et al. |
| 2012/0177872 | A1 | 7/2012 | Tsai et al. |
| 2013/0337207 | A1 | 12/2013 | Mueller et al. |
| 2014/0170371 | A1 | 6/2014 | Kamiya et al. |
| 2015/0030805 | A1 | 1/2015 | Tsai et al. |
| 2015/0175250 | A1 | 6/2015 | Deobald et al. |
| 2021/0114336 | A1 | 4/2021 | Tsai et al. |
| 2022/0297407 | A1 | 9/2022 | Tsai et al. |

FOREIGN PATENT DOCUMENTS

| | | |
|---|---|---|
| EP | 2830042 A1 | 1/2015 |
| EP | 2663450 B1 | 7/2018 |
| WO | WO 2018/181983 A1 | 10/2018 |
| WO | WO 2018/187186 A1 | 10/2018 |
| WO | WO 2020/252126 A1 | 12/2020 |

OTHER PUBLICATIONS

An, et al., "Stacking sequence optimization and blending design of laminated composite structures," Structural and Mulitdisciplinary Optimization, published online Nov. 28, 2018, doi.org/10.1007/s00158-018-2158-1.

Chen et al., "Optimal design of composite laminates for minimizing delamination stresses by particle swarm optimization combined with FEM," Structural Engineering and Mechanics, vol. 31, No. 4, 407-421, (2009).

Hühne, C. et al. Robust Design of Composite Cylindrical Shells Under Axial Compression—Simulation and Validation, Thin-Walled Structures, Issue 46, (2008), pp. 947-962.

Khot, N.S. On The Influence of Initial Geometric Imperfections on The Buckling and Postbuckling Behavior of Fiber-Reinforced Cylindrical Shells Under Uniform Axial Compression, Technical Report AFFDL-TR-68-136, Oct. 1968, (69 pages), Air Force Flight Dynamics Laboratory Wright-Patterson Air Force Base, Ohio.

Zhang, et al., "Winding orientation optimization design of composite tubes based on quasi-static and dynamic experiments," Thin-Walled Structures, 127, 425-433, (2018).

U.S. Appl. No. 16/500,337, Non-Final Office Action dated May 13, 2021.

U.S. Appl. No. 16/500,337, Notice of Allowance dated May 11, 2022.

U.S. Appl. No. 16/500,337, Requirement for Restriction/Election dated Jan. 26, 2021.

U.S. Appl. No. 16/500,337, Non-Final Office Action dated Nov. 12, 2021.

WIPO Application No. PCT/US2018/025600, PCT International Preliminary Report on Patentability dated Oct. 8, 2019.

WIPO Application No. PCT/US2018/025600, PCT International Search Report and Written Opinion of the International Searching Authority dated Jul. 17, 2018.

WIPO Application No. PCT/US2020/037171, PCT International Preliminary Report on Patentability dated Dec. 14, 2021.

WIPO Application No. PCT/US2020/037171, PCT International Search Report and Written Opinion of the International Searching Authority dated Sep. 18, 2020.

U.S. Appl. No. 17/618,680, Non-Final Office Action dated Jun. 8, 2023.

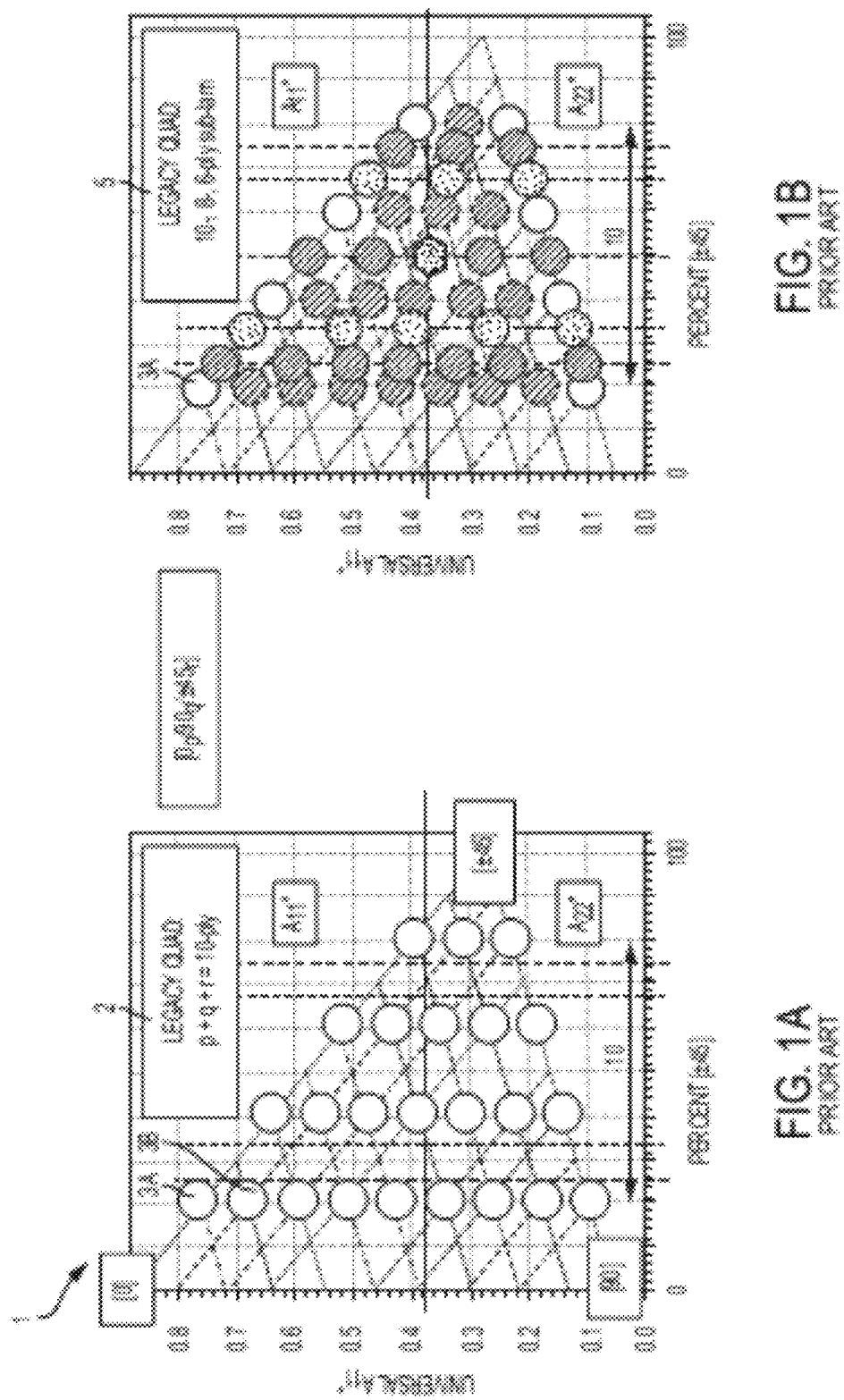

| Att° | 0 | 10 | 20 | 30 | 40 | 50 | 60 | 70 | 80 | 90 |
|---|---|---|---|---|---|---|---|---|---|---|
| 0 | 0.885 | 0.861 | 0.796 | 0.708 | 0.618 | 0.546 | 0.500 | 0.477 | 0.470 | 0.469 |
| 10 | 0.861 | 0.837 | 0.772 | 0.684 | 0.594 | 0.522 | 0.476 | 0.453 | 0.446 | 0.445 |
| 20 | 0.796 | 0.772 | 0.707 | 0.618 | 0.529 | 0.457 | 0.410 | 0.388 | 0.381 | 0.380 |
| 30 | 0.708 | 0.684 | 0.618 | 0.530 | 0.441 | 0.368 | 0.322 | 0.300 | 0.293 | 0.292 |
| 40 | 0.618 | 0.594 | 0.529 | 0.441 | 0.351 | 0.279 | 0.233 | 0.210 | 0.203 | 0.202 |
| 50 | 0.546 | 0.522 | 0.457 | 0.368 | 0.279 | 0.207 | 0.160 | 0.138 | 0.131 | 0.130 |
| 60 | 0.500 | 0.476 | 0.410 | 0.322 | 0.233 | 0.160 | 0.114 | 0.092 | 0.085 | 0.084 |
| 70 | 0.477 | 0.453 | 0.388 | 0.300 | 0.210 | 0.138 | 0.092 | 0.069 | 0.062 | 0.061 |
| 80 | 0.470 | 0.446 | 0.381 | 0.293 | 0.203 | 0.131 | 0.085 | 0.062 | 0.055 | 0.054 |
| 90 | 0.469 | 0.445 | 0.380 | 0.292 | 0.202 | 0.130 | 0.084 | 0.061 | 0.054 | 0.053 |

DOUBLE-DOUBLE FIELD [+/-]

OCTOGRID CONSTRUCTIONS AND APPLICATIONS UTILIZING DOUBLE-DOUBLE LAMINATE STRUCTURES

CROSS REFERENCE TO RELATED APPLICATIONS

This application claims priority to and the benefit of U.S. Provisional Application No. 63/188,206, filed May 13, 2021; the contents of which as are hereby incorporated by reference in their entirety.

BACKGROUND

Technical Field

The present invention relates generally to certain applications of composite laminates and/or utilization of the composite laminates formed from double-double laminate configurations and constructed into octogrid structures having various applications, including without limitation with drones (e.g., unmanned aircraft) and/or wind turbines. Octogrid structures may be lighter, stronger, and lower in cost, as compared to conventional laminate structures, due in part to ease of tapering, finite-length pre-cut tapes, and the like.

Description of Related Art

Conventional composite laminate structures were generally designed to emulate the strength characteristics of conventional metal-based laminate materials and as such are constrained to designs having layers of plies that are both symmetrical and balanced. Such conventional structures, when so constrained and containing at least four distinct ply layers formed from black carbon fibers, were commonly referred to in the art as "black aluminum" due to their combined carbon makeup and metal-emulating characteristics. Additional details surrounding conventional composite laminate structures may be understood with reference to US Publication No. 2006/0093802, the contents of which as are hereby incorporated herein by reference in their entirety.

These conventional composite laminate structures oftentimes utilized "legacy quad laminates" (as commonly referred to), which involve laminates made of collections of [0], [±45] and [90] plies (see e.g., legacy quad field 1, illustrated in FIG. 1A and detailed elsewhere herein). When one each of the three layers is stacked, the resulting structure is quasi-isotropic because it matches the isotropic properties of aluminum, which informs one of the reasons for calling such composite laminate black aluminum. The legacy quad laminates were always discrete in nature, meaning a limited number of ply angles and/or ply angle combinations (of multiple layers of the four discrete plies, as listed above) could be chosen. To have desired directional properties, more plies than the quasi-isotropic made of four plies had to be added, leading to 6, 8, 10 or more plies of sub-laminates (as detailed elsewhere herein). When laminates are made with mid-plane symmetry, resulting total laminates have doubled thickness of 12, 16, and 20 plies. If thicker laminates are needed, multiples of 12, 16, and 20 had to be considered. In extreme cases, laminates are selected based on total laminate without use of sub-laminates. In such cases, the total laminate may be selected based on the percentages of 0°, ±45° and 90° with plies dispersed across the thickness. Only explicit requirements in such cases are mid-plane symmetry, and a limit of three on-ply orientation groupings (i.e., no more identical ply groupings can be stacked together).

The above is a unique issue with the legacy quad family of laminates. First, the sub-laminates are thick, secondly, mid-plane symmetry is required, and, lastly, huge jump in laminate thickness as thick sub-laminates are added. The huge jump can be mitigated by adding some chosen plies not part of the repeated sub-laminates. But such arbitrarily added plies, in thickness less than 6, 8, or 10 plies, differ from the properties of the sub-laminates and make optimization practically impossible. There is also an issue on minimum gauge. Many components and devices require laminate thickness less than 12, 16, and 20 plies. The use of legacy quad composites is thus not feasible in those contexts, such as for example in the realm of fuselage or wing skins. Sub-laminates of this nature were also delamination prone, and multiple failure modes resulting from thousands of fiber discontinuities and matrix cracking. Complex procedures to blend adjacent laminates with different stacking and thickness, and to drop or add plies are required for a complex structure and impede optimization and manufacturing.

With reference now to FIG. 1B, relative to the 10-ply legacy quad field 1 illustrated in FIG. 1A, populated therein also are the discrete sub-laminates achievable (indicated by the discrete dots or anchors shown) with not only a 10-ply sub-laminate, but also with associated 6-ply and 8-ply configurations (i.e., a combined 10-, 8-, and 6-ply configuration 5). Thus, it may be understood that—even with the 6-, 8-, and 10-ply conventional legacy quad sub-laminate structures—a total field of only forty-seven (47) laminates was achievable (see again, FIG. 1B; see also FIG. 3B). Notably, though, holes remain visible between the respective discrete sub-laminate structures (i.e., although some of the dots or anchors 6 may partially overlap one another, not all of the dots or anchors 6 fully overlap with each other and thus fill all of the visible space in the field); as a result, achieving certain desirable material characteristics remains challenging and many times simply unachievable (again, due to the various self-inflicted constraints on conventional legacy quad field sub-laminates having different thicknesses in 6 to 10-plies that make blending and ply drop so complicated).

Inefficiencies arose in conventional composite laminate structures due to their discrete nature, exacerbated by self-inflicted constraints in the industry, including a perceived requirement that all composite laminate structures—and in particular the sub-laminate structures therein—have balanced and symmetric material characteristics; stated otherwise, they involve necessarily thick sub-laminate structures and mid-plane symmetry. Specifically, symmetric laminates involve a reflective or mirror-image equivalence of ply orientation about their mid-plane, while balanced laminates involve an equal number of positively (+) and negatively (−) oriented plies across their entirety. Such constraints have historically largely remained unchallenged due to concerns that conventional composite laminated structures will undesirably warp upon cool down from a curing temperature or increased residual stress when the operating temperature changes. For example, to enforce symmetry, a minimum number of plies must be doubled leading to 12, 16, and 20 plies, or higher multiples like 24, 32 and 40, and beyond. Additional details surrounding conventionally imposed constraints may be understood with reference to U.S. Pat. No. 9,296,174, the contents of which as are hereby incorporated herein by reference in their entirety.

Symmetric laminates have been traditionally formed by stacking the multiple layers of various unidirectional plies in such a manner that the composite laminate exhibits a mirror-image of itself about a mid-plane of the structure. Such lamination processes are generally time and labor intensive as well as being prone to error, requiring special attention to ensure precision ordering of the respective composite layers and may result in an unnecessary number of plies, which may contribute to excessive process waste and cost. Still further symmetric laminates have historically proven cumbersome when seeking to taper the exterior surface of a structure, due at least in part to the desire to maintain symmetry throughout, even when dropping ply layers to form the taper. In addition, as the individual or a pair of symmetric plies with substantially the same orientation is dropped to form a taper, the laminate stacking sequence and thus the material's strength characteristics, are altered.

Although not problematic on their own, balanced laminates, like symmetric ones described above, have been traditionally formed by stacking multiple layers of various unidirectional plies at a plurality of precise orientations with relatively large angles between them. For example, each off-axis ply, such as a +45° ply is typically matched (e.g., mirrored) by a −45° ply. In addition, a common practice was to have four-ply orientations incorporating angles of −45°, 0°, +45°, and 90° (i.e., the [0], [±45] and [90] configuration mentioned previously herein, simply using an alternative nomenclature). Three-ply orientations were also common, such as 0°, ±45° configurations; yet critical was that the number of positive (+) and negative (−) oriented plies remain equal.

Balanced and symmetric laminates of this nature have also traditionally created difficulty when trying to minimize laminate and even sub-laminate thickness, requiring ever thinner plies as the only option to offset the need to add 6-, 8- or 10-ply (or even more plies such as being doubled when symmetry is required) to achieve desirable material characteristics. Tapering (i.e., ply drop) complexities have also existed in these structures as well, with one exemplary limitation being that dropping of specific plies or groups thereof must not disturb the desired symmetry and balance. As a result, due to the discrete nature of available ply angles (influenced by both the extra thick sub-laminate structures and the symmetry constraints detailed herein), there were necessarily gaps between achievable laminate stiffness and/or strength characteristics that simply could not be bridged. Multiple failure modes, thousands of fiber discontinuities from ply drops and results from blending, and complexity in manufacturing were thus often faced due to self-inflicted constraints; stated otherwise, an optimal set of material characteristics in a laminate structure oftentimes had to be sacrificed to satisfy various self-imposed constraints; as a result, less than optimal laminate structures were used.

Improving upon conventional balanced and symmetric laminates, a continuous double-double sub-laminate structure was initially developed, as illustrated in FIGS. 2A-C. With reference now first to FIG. 2B, the number of laminates in each family of double-double depends on the angle increments. In the left-hand chart of tabular data, there are 100 laminates, from 0 to 90-degree plies and in 10-degree angle increments. The same increments are used in the table in FIG. 2A. Stated otherwise, in being continuous every value can be met; there are no holes. As may be understood, by comparison to FIG. 1B (illustrating the legacy quad laminate discrete members), many more options are provided and in a manner that provides a truly continuous field of variables from which to select for construction of any particular element for a structural component or the like.

In the right-hand chart of FIG. 2B, the tabular data also illustrates, from 0 to 90 degrees and in 2° increments, a further granular level of an achievable continuous double-double sub-laminate field 35. It should be understood that this field is achieved in substantially the same manner as the continuous field 30 described above and also illustrated in FIG. 2B, but for the degree of granularity in field 35 being at increments of 2° between each ply within the sub-laminate structure. The result, as illustrated, is a collection 35 (by way of non-limiting example) that includes 2,116 continuous laminates 36 that may all be utilized for forming a desired sub-laminate structure. Notably, a continuous field is provided, as compared with the limited set of discrete members provided in conventional configurations. For many devices high precision in stiffness may be required. They include acoustic and high frequency situations which often require such precision.

FIG. 2C further illustrates the manner in which the degree of granularity involved in forming each collection of continuous double-double sub-laminates was expansive, whereby here there is illustrated a continuous field 40 (see right-hand chart), produced with angle increments of 1°. This field results, as illustrated in the right-hand chart of FIG. 2C, in a double-double laminate field 40 that contains 8,281 sub-laminate structures from which to choose, each having distinctive material characteristics associated therewith. It should be understood that the illustrated angle increments in these figures (e.g., 10°, 2°, 1°) are non-limiting examples; in view of the derivative nature of the double-double sub-laminate field (as detailed elsewhere herein), any angle increment can be selected, depending upon the degree of resolution that may be necessary to obtain a viable stiffness or strength match (as also detailed elsewhere herein) to a conventional laminate structure and/or sub-laminate structure. In this manner, the double-double sub-laminate fields 30, 35, 40 should be understood as indicative of a continuous field of selectable ply angle and ply layer configurations, so as to best match conventional laminate structures having much greater thicknesses and/or to fill gaps of strength or stiffness values in such conventional structures due to the limited set of 47 discrete values under legacy quad-type configurations, as described previously herein.

Returning now to FIG. 2B, various advantages of the previously developed double-double field 30, 35 (depending on incremental degree chosen) may be understood. First, a continuous field of laminates [±Φ/±Ψ] (see FIG. 2C as well, illustrating the discrete and independent [±Φ] 42 and [±Ψ] 41 ply angle sets) is provided for selection therefrom, as contrasted with the discrete legacy quad collections (i.e., 47 options versus double double's 8,281+ potential options). Zooming to achieve higher resolution (i.e., granularity) is conceptually easy via various embodiments of the double-double sub-laminate described herein and is shown on the right side of FIG. 2B. Equally important with granularity and this continuous field is the advantage that the sub-laminate thickness remains constant, at most being 4-ply; 2- or 1-ply configurations. Stiffness values may thus be also changed in a continuous fashion (i.e., no holes or gaps), simply by changing the angles within the continuous field, as may be understood with reference to FIG. 2A. This makes optimization possible, blending by changing one helix at a time feasible (as described elsewhere herein), and out-of-plane homogenization more easily achieved (as also described elsewhere herein). All these features—not available from the legacy quad-type structures—via the various embodiments described herein are now achievable, leading to stronger, tougher, fewer failure modes, lighter, lower cost structure, not to mention lower minimum gage, with natural mid-plane symmetry, and feasible automated layup.

Referring now also to FIG. 2A, therein is illustrated a chart of stiffness values 25 for the previously developed double-double laminate structures, illustrating the continuous field provided thereby, dependent upon the ply angle values [±Φ/±Ψ] of the double-double sub-laminate. For example, a double-double sub-laminate having four total plies of [±Φ=20°/±Ψ=60°] would have a stiffness value of 0.410. Stiffness values of each possible combination in the double-double sub-laminate field (see e.g., fields 30, 35, 40 of FIGS. 2B-C) are influenced (i.e., changed) by changing the angles of each pair of plies within each angle set (i.e., two sets within each sub-laminate, as will be detailed elsewhere herein). Notably, there within the previously developed structure 50% of each of ±Φ and ±Ψ. This provided a degree of simplicity, as compared to legacy quad members, where differing percentages of each angle must be utilized to alter stiffness values.

Additional details regarding the characteristics and advantages of the double-double sub-laminate field may be understood with reference to not only U.S. Pat. No. 9,296,174; but also U.S. Pat. No. 10,589,474; U.S. Publication No. 2021/0114336; and International Publication Nos. WO 2020/252126 and WO 2021/188783; cited as non-limiting examples of the applicant's previously developed technology.

Notwithstanding the advantages realized via the previously developed double-double sub-laminate field, the formations of grids therefrom, retained challenges. For example, in certain circumstances, joints are the weakest points, shear rigidity is minimal, tapering is cumbersome, and hub construction (i.e., for propellers and/or blades) are inefficient with respect to weight and/or labor.

BRIEF SUMMARY

It will be shown that, utilizing an octo-grid structure, hub-like components can be constructed from the double-double sub-laminate field and further optimize various advantageous characteristics, achieving unforeseen advantages. These advantages include at least those listed hereinbelow.

One exemplary yet important advantage realized in octo-grid structures is due to the use of finite-length strips to produce the center grid from which eight branches may be anchored. The height of the branches and the grid may thus be, in certain embodiments, the same because of the inserts that allow the height of the branches to match that of the joints in the grid. With these inserts, compaction of the composites can be uniform and good quality ensured. In addition, the joints will be better aligned with the continuous strips and discontinuous inserts. Joints are the weakest point. Such good alignment is critical to ensure the quality of the strength of the joints.

Also advantageous in the described octo-grid structures is the ability to add shear rigidity with [±45] panel bonded to the opening of the center square grid is also critical in providing a solid foundation for the 8 branches to be joined together. The ability to taper the branches is also simplified, facilitating improvements to reduce the weight without loss of significant stiffness and strength of each branch (see also WO 2020/252126). The octogrid can be produced with robotic arms that can place each long and short strips in prescribed order, with minimized manual labor, which may be error-prone and the like. Still further, as non-limiting examples, hubs for propellers and wind turbine blades or the like can also be replaced by octogrid, with extended branches to serve as spars. Significant weight and cost reductions are possible with spars the go through the center of the joints. The branches of octogrid can be [0] or double-double to provide a balance between bending and twisting.

Various embodiments of the present invention are thus directed toward an octogrid sub-structure for use in forming a composite laminate structure. The octogrid sub-structure comprises: a first ply layer comprising a plurality of first elongate tapes oriented in a first direction and a plurality of second elongate tapes oriented in a second direction, the second direction being offset from the first direction at an approximate right angle; and a second ply layer comprising a plurality of third elongate tapes oriented in the first direction and a plurality of fourth elongate tapes oriented in the second direction, the second ply layer being overlaid atop the first ply layer, wherein: each of the plurality of first, second, third and fourth elongate tapes comprises a first set of ply layers and a second set of ply layers offset from the first set of ply layers by an angle of at least 25 degrees; a first end of each of the plurality of first, second, third and fourth elongate tapes is positioned approximately adjacent a midpoint of an adjacently positioned one of the plurality of first, second, third and fourth elongate tapes; and a second and opposing end of each of the plurality of first, second, third and fourth elongate tapes extends freely beyond a central grid portion defined by a length of a portion between the first end and the midpoint of a portion of the plurality of first, second, third and fourth elongate tapes.

Various embodiments of the present invention are also directed toward a composite octogrid structure for use in a composite laminate structure. This structure comprises: a plurality of first ply layers each comprising a plurality of first elongate tapes oriented in a first direction and a plurality of second elongate tapes oriented in a second direction, the second direction being offset from the first direction at an approximate right angle; and a plurality of second ply layers each comprising a plurality of third elongate tapes oriented in the first direction and a plurality of fourth elongate tapes oriented in the second direction, wherein: the plurality of first and second ply layers are overlaid relative to one another in an alternating fashion so that a first ply layer is intermediate any sequential second ply layers and vice-versa; each of the plurality of first, second, third and fourth elongate tapes comprises a first set of ply layers and a second set of ply layers offset from the first set of ply layers by an angle of at least 25 degrees; a first end of each of the plurality of first, second, third and fourth elongate tapes is positioned approximately adjacent a midpoint of an adjacently positioned one of the plurality of first, second, third and fourth elongate tapes; a second and opposing end of each of the plurality of first, second, third and fourth elongate tapes extends freely beyond a central grid portion defined by a length of a portion between the first end and the midpoint of a portion of the plurality of first, second, third and fourth elongate tapes.

Various embodiments of the present invention are still further directed toward a method of forming a composite octogrid laminate structure. The method involves: forming a plurality of first ply layers by sequentially dispensing a plurality of first elongate tapes oriented in a first direction and a plurality of second elongate tapes oriented in a second direction, the second direction being offset from the first direction; forming a plurality of second ply layers by sequentially dispensing a plurality of third elongate tapes oriented in the first direction and a plurality of fourth elongate tapes oriented in the second direction; and stacking the plurality of first and second ply layers in an alternating fashion so that a first ply layer is intermediate any sequentially stacked second ply layer and vice-versa, wherein: each of the plurality of first, second, third and fourth elongate tapes comprises a first set of ply layers and a second set of ply layers offset from the first set of ply layers by an angle of at least 25 degrees; a first end of each of the plurality of first, second, third and fourth elongate tapes is positioned approximately adjacent a midpoint of an adjacently positioned one of the plurality of first, second, third and fourth elongate tapes; a second and opposing end of each of the plurality of first, second, third and fourth elongate tapes extends freely beyond a central grid portion defined by a length of a portion between the first end and the midpoint of a portion of the plurality of first, second, third and fourth elongate tapes.

The method may be utilized with any variation of the octogrid sub-structures and octogrid laminate structures formed therefrom as otherwise claimed or described herein.

BRIEF DESCRIPTION OF THE FIGURES

Brief reference will now be made to the accompanying drawings, which are not necessarily drawn to scale, and wherein:

FIG. 1A, representative of prior art, shows a legacy quad conventional sub-laminate family, with focus upon a 10-ply configuration;

FIG. 1B, representative of prior art, shows the legacy quad conventional sub-laminate family of FIG. 1A, incorporating further 8- and 6-ply configurations alongside the 10-ply configuration;

FIG. 2A, representative of prior art, shows one master-ply stiffness component of all of the sub-laminates within the double-double sub-laminate family;

Figure 2B:
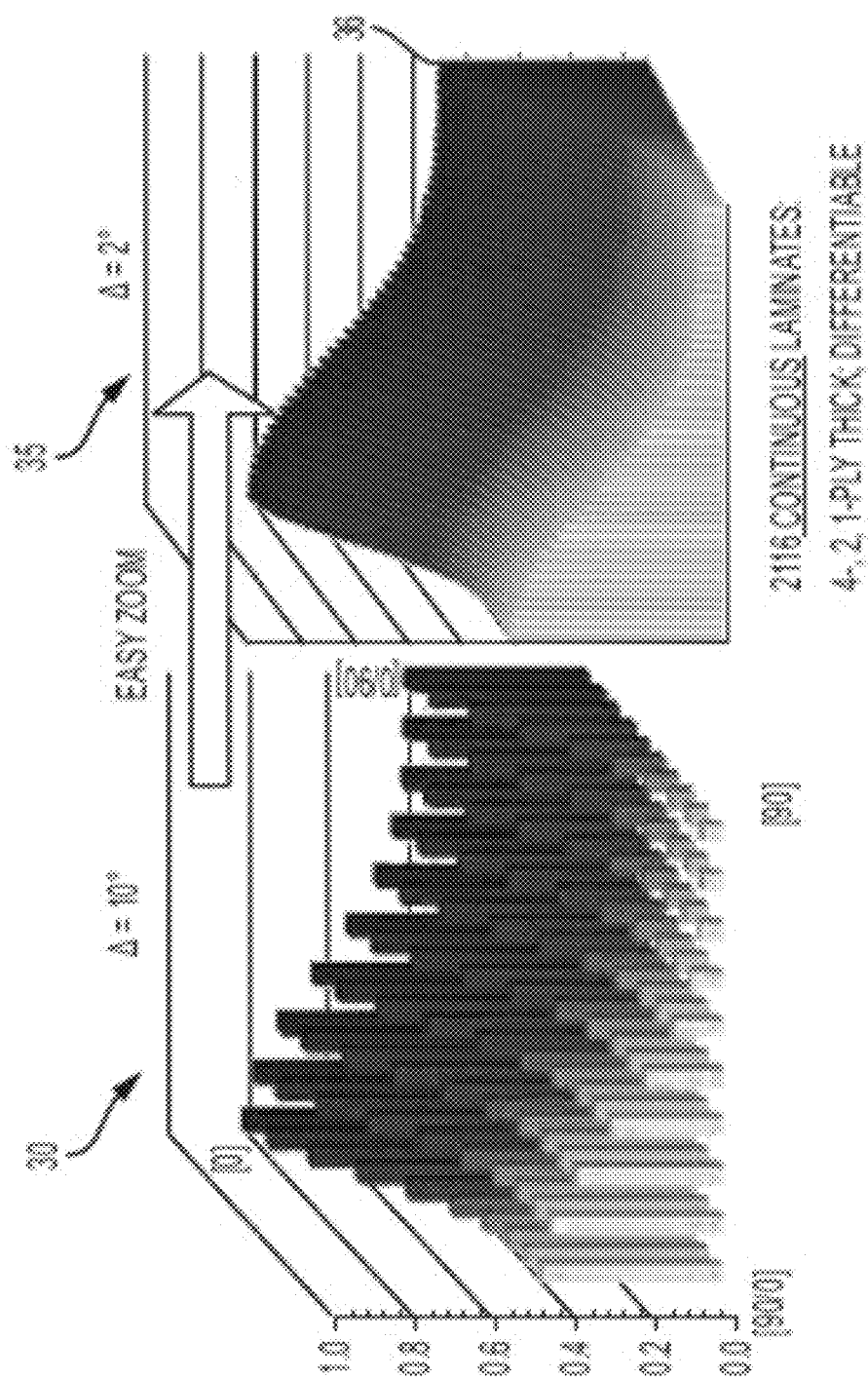
FIG. 2B, representative of prior art, shows two three-dimensional representations of the double-double sub-laminate family at angle increments of 10 and 2 degrees, respectively.

Additional details regarding various features illustrated within the figures are described in further detail below.

DETAILED DESCRIPTION OF VARIOUS EMBODIMENTS

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Conventional Laminate Characteristics

As mentioned previously herein, conventional legacy quad laminates were made of collections of [0], [±45] and [90] ply configurations. These laminates were discrete and not possible to interpolate due to a variety of self-inflicted constraints (e.g., fixed angles, symmetry, etc.). To have more directional properties, plies had to be added to their sub-laminates, which in turn increased weight and decreased design flexibility of laminate structures due to thickness. Nevertheless, to achieve somewhat desirable material characteristics of legacy laminates, necessarily at least 6-, 8- and 10-ply thick (and oftentimes thicker) sub-laminates were utilized. When laminates with mid-plane symmetry are required and met, their thicknesses with 6- to 10-ply sub-laminates would be doubled, tripled or more. Such thick sub-laminates were, in addition to being undesirably heavy in weight, delamination prone, which also made blending, ply drop, and ply layup difficult; still further material characteristics could oftentimes not be optimized (to, for example, desired characteristics) due to limitations imposed by the discrete number of ply configurations available in the field (see field 1 illustrated in FIG. 1A). As a result, there are gaps between laminate stiffness and strength that cannot be bridged using conventional legacy quad laminates. Multiple failure modes and complexity in manufacturing thus existed.

These various considerations involved with conventional legacy quad laminates may be understood with reference again to FIG. 1A, wherein the legacy quad field 1 for a 10-ply thick sub-laminate 2 is illustrated. Once more, conventional nomenclature is utilized as $[0_p/90_q/\pm45_r]$ to identify the sub-laminate, wherein p represents the number of 0° ply layers, q represents the number of 90° ply layers, and r represents the number of 45° ply layers. In the specific example illustrated 10 total plies are provided. In example discrete sub-laminate 3A, the sub-laminate is formed with 80% 0° ply layers, 20%±45° ply layers and no 90° ply layers (i.e., for the 10-ply configuration illustrated, eight 0° ply layers, two ±45° ply layers and no 90° ply layers). Another discrete sub-laminate 3B is also highlighted, wherein the sub-laminate is formed with 70% 0° ply layers, 20%±45° ply layers and thus 10% 90° ply layers (i.e., for the 10-ply configuration illustrated, seven 0° ply layers, two +45° ply layers and one 90° ply layers). As another non-limiting example, if stiffness with 80% 0°, 10% 90° ply and 10%±45° ply is desired, the sub-laminate will have to be 2° ply thick. Remaining characteristics for the other discrete twenty-four (24) sub-laminates available (i.e., each dot or anchor in FIG. 1A) may be extrapolated from these examples.

With reference now to FIG. 1B, relative to the 10-ply legacy quad field 1 illustrated in FIG. 1A, populated therein also are the discrete sub-laminates achievable (indicated by the discrete dots or anchors shown) with not only a 10-ply sub-laminate, but also with associated 6-ply and 8-ply configurations (i.e., a combined 10-, 8-, and 6-ply configuration 5). Thus, it may be understood that—even with the 6-, 8-, and 10-ply conventional legacy quad sub-laminate structures—a total field of only forty-seven (47) laminates was achievable (see again, FIG. 1). Notably, though, holes remain visible between the respective discrete sub-laminate structures (i.e., although some of the dots or anchors 6 may partially overlap one another, not all of the dots or anchors 6 fully overlap with each other and thus fill all of the visible space in the field); as a result, achieving certain desirable material characteristics remains challenging and many times simply unachievable (again, due to the various self-inflicted constraints on conventional legacy quad field sub-laminates having different thicknesses in 6 to 10-plies that make blending and ply drop so complicated).

Figure 2C:
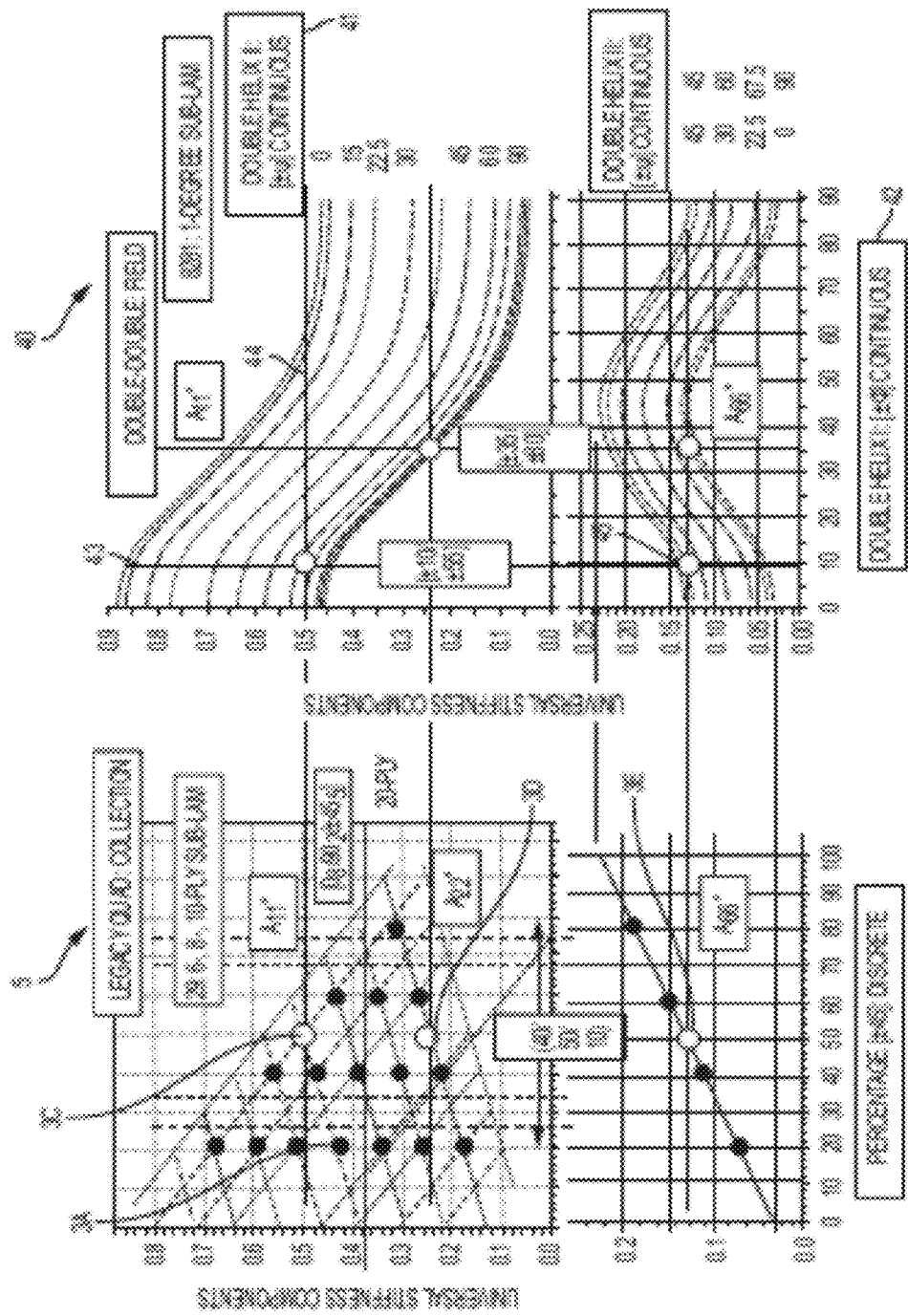
FIG. 2C, representative of prior art, shows aligned charts identifying viable replacements within the double-double sub-laminate field for anchors within the legacy quad sub-laminate field.

The collections of FIGS. 1A-B are also informative in terms of guidance of the laminate design without use of sub-laminates, as mentioned previously herein. As a non-limiting example, the entire laminate may be designed to satisfy the percentages of the quad ranges in 0°, ±45° and 90°. Beyond the requirements of symmetry and ply grouping to larger than three (again, as mentioned previously herein), every ply stacking selection is subjective, meaning there is no scientific or mathematical analysis involved, but for having well dispersed plies that would facilitate ply drop and blending. Unfortunately, this approach often leads to multiple internal fiber discontinuities, ply wrinkling, and other defects that can be sources of multiple damage initiation sites. Double-double laminates and sub-laminate structures, in contrast, achieve structures having no internal defects, due in part to the continuous field of options provided (see FIGS. 2A-C, as discussed elsewhere herein). In this context, having thin sub-laminates with constant thickness makes blending, ply drop, and manufacturing much simpler than the quad laminates in one piece or in thick sub-laminates; however, constraints and challenges have remained.

Notably, throughout the above discussion and illustrations it should be understood that one of the core problems of the legacy quad laminate design is that all sub-laminates are discrete. As a result, even with utilization of 6-, 8-, and 10-ply configurations, there are no comprehensive connections among all 47 members in the sub-laminate. Thus, beyond the remaining "holes" where certain material characteristics may remain unachievable, blending between different laminates (i.e., from adjoining elements) has no standard solution. This is because there is no continuous connection between the two different laminates, for example where each laminate is a different discrete configuration. There will be thousands of fiber discontinuities inside each laminate. They are the sources of multiple failures under static and fatigue loading. Tapering is also difficult due to the lack of continuity. As a result, laminated structures using legacy quad oftentimes cannot be optimized with respect to material characteristics, and ply stacking (including tapering and blending) is extremely complicated, making automated layup procedures not only costly, but also necessarily involving compromises in material characteristics and thus structural integrity, possibly leading to multiple material failure modes that are not possible to predict (at least in part due the complexities and uncertainties involved between the discrete dots or anchors).

Double-Double Laminate Characteristics

The continuous field of double-double sub-laminate structures described herein (see, as previously developed, with reference to FIGS. 2A-C described herein-above) achieves sub-laminates with at most 4-ply thick structures; even thinner 2- and 1-ply thick configurations are obtainable. Throughout various embodiments, the ply angles are also continuous, making blending of different laminates and their optimization achievable. Sub-laminate thickness remains constant. For directional property, the angles of each double helix can change continuously to the desired values. Plies are not added like the case of legacy quad family. As a result, far fewer failure modes (and virtually no unpredictable failure modes) are encountered, and automated layup procedures may be conducted in relative simplistic fashions. All of these and still other advantages lead to much simpler and lighter structures that are also better optimized for purposes of efficiency and accuracy, notably improvements given that the further above-detailed degree of uncertainty with conventional legacy quad laminate structures is becoming ever-increasingly unacceptable across multiple industries. Having thinner sub-laminates (4 of less versus 12 to 20) the minimum gage requirement is lowered. Many electronic and medical devices can now use composite laminate. This is not possible if laminates must be multiples of 12 to 20 plies.

1. Utilization of Card Sliding Technique for Tapering

Figure 3A:
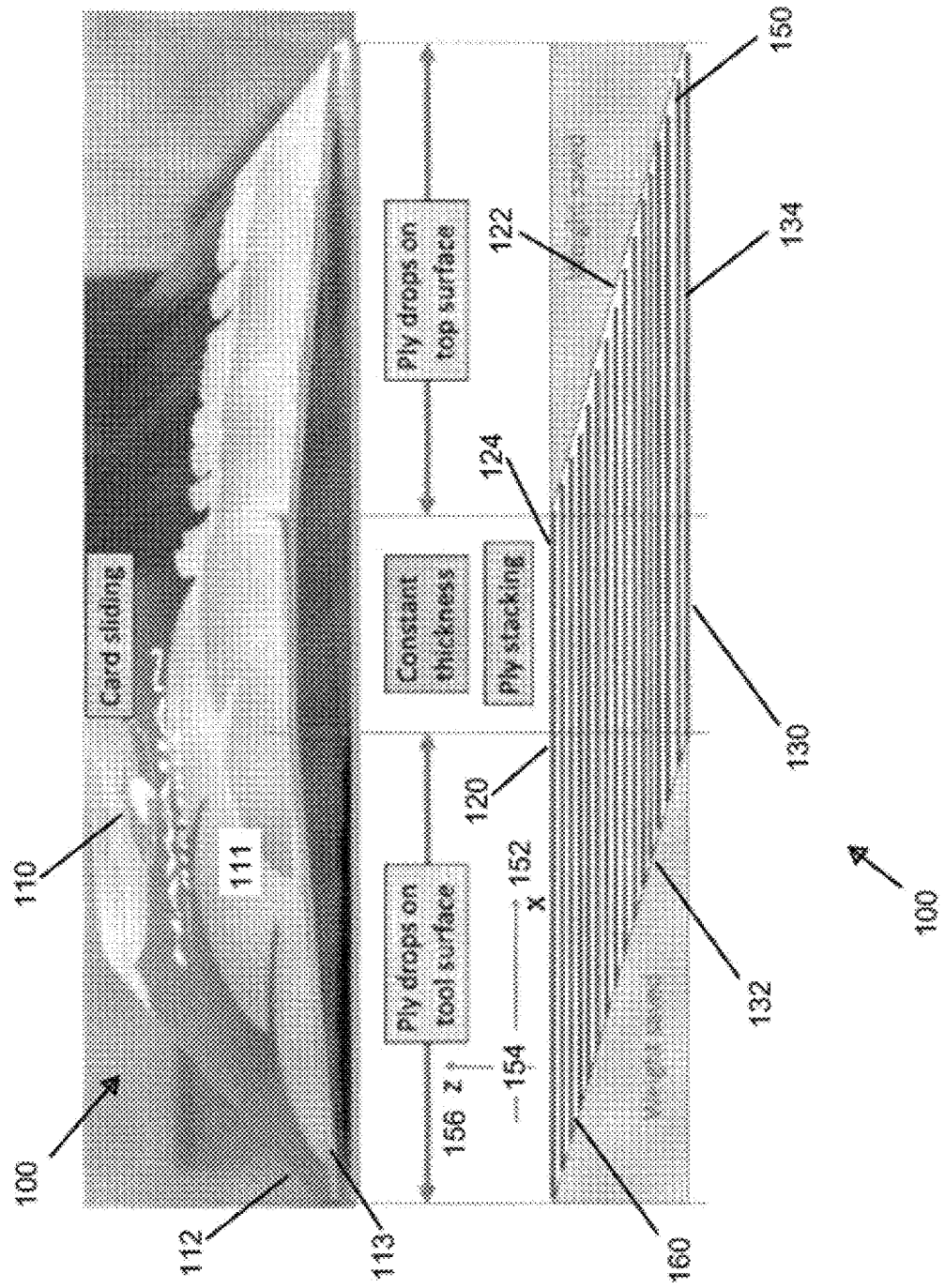
FIG. 3A shows a set of composite laminate cards stacked and slid so as to form a composite laminate structure.

Turning to FIG. 3A, a set of finite laminate cards 110 are illustrated having been stacked in an offset manner relative to one another to define a composite laminate structure 100 according to various embodiments. Each card 110 may itself be a single double-double sub laminate module or building block (e.g., four-plies in thickness) (see also WO 2020/252126 and WO 2021/188783). Thickness may be as thin as 0.24 mm utilizing thin-ply constructions previously described. Notably, though, each card 110 is consistently sized and profiled. To ensure a linear profile, each card 110 has a planar surface 111 (an opposing planar surface is also provided, not shown) with a pair of opposing primary edges 112 and a pair of opposing secondary edges 113. In certain embodiments, each card 110 may be substantially square-shaped, resulting in the edges 112, 113 being of substantially the same length. In other embodiments, each card 110 may be substantially rectangularly-shaped, resulting in the primary edges 112 being larger in length than the secondary edges 113.

In certain exemplary embodiments, each card 110 may be made from the same material, in addition to being the same shape and size. In other embodiments, though, differing layers of the cards (i.e., each card or a subset, alternating or otherwise) may be made of different materials. Still further, within each card 110, where formed from sub-laminate modules that might involve a set of plies (as described elsewhere herein), it should be understood that the sub-laminate modules forming each card 110 need not be the same across multiple cards and/or even within a single set of cards. Thicknesses, materials, and sub-components may all vary across sets of cards; the only requirement is to have the same shape and size in each set of cards.

In certain exemplary embodiments, each card 110 may have primary edge 112 dimensions of any of four (4), six (6), or twelve (12) inches. In these and other embodiments, each card 110 may have secondary edge 113 dimensions of any of four (4), six (6), or twelve (12) inches. Combinations may thus be envisioned that are square or rectangular shaped, such as 4×4 cards, 6×6 cards, 12×12 cards, 4×6 cards, 6×12 cards, or the like. It should be understood that the primary and secondary edges 112, 113 may be smaller or larger than four or twelve inches; they may also be any size within that range, thus facilitating provision, as a no-limiting example, of cards 110 having a size of 6×8 inches or 6×9 inches, or otherwise. Of note, according to various embodiments, where a composite laminate structure 100 is formed from a set of cards 110, the latter are generally all shaped and sized identical relative to one another, within the composite laminate structure. In some embodiments, though, as will be described elsewhere herein, differently shaped and/or sized cards 110 may be mixed within a single composite laminate structure 100 to provide two-dimensional tapering. It is known, though, that as compared to one-dimensional tapering, when sliding occurs in both x- and y-axis directions, corners of any resulting (i.e., via card stacking) composite laminate structure may be jagged. As a result, some cutting and/or shaping may be required; that said, various advantages remain surrounding the ease of stacking and tapering, not to mention the weight savings, also described elsewhere herein—even despite the need occasionally for cutting/trimming at corners.

Remaining with FIG. 3A, it should be understood that a composite laminate structure 100 formed from a set of cards 110 will itself have several defining characteristics, including a top surface 120 (which will be planar with cards having planar surfaces 111 are utilized) and an opposing tool surface 130. Due to the card sliding techniques described elsewhere herein, the composite laminate structure 100 has various portions, defining opposing tapers, namely a tapered portion 122 of the top surface 120, a tapered portion 132 of the tool surface 130, and a constant thickness portion 140 (see FIG. 5). Opposing first and second edges 142, 144 of the constant thickness portion 140 may define starting points of the tapered portions 122, 132, defined also by the primary edges 112 of a topmost or bottommost card, respectively.

The top surface 120 according to various embodiments may comprise not only the tapered portion 122 but also a planar portion 124. The tool surface 130 according to various embodiments may likewise comprise not only the tapered portion 132 but also a planar portion 134. As mentioned, primary edges 112 of respective cards 110 within the composite laminate structure define the respective tapered portions 122, 132. Due to the finite and equal size of each of the cards, sliding techniques employed result in distinct offset top surfaces 150 and offset tool surfaces 160, respectively. The size of each of these surfaces 150, 160 may vary, dependent upon the degree of slide provided between respective cards 110. Offsets may thus be constant, variable, continuous, and/or discontinuous across various composite laminate structures, however desirable (for example, if symmetry lengthwise is not needed).

In certain embodiments, dimensions of the offset surfaces 150, 160 and thus the degree of sliding between adjacently positioned cards 110 of the set of cards in a composite laminate structure may range from ⅛ to 1.0 inches. Other embodiments may have offset surface dimensions in a range from ¼ to ¾ inches. Certain embodiments may range from ¼ to ½ inches. Still other embodiments may have offsets surface dimensions ranging from 0.01 to 4.0 inches; 0.05 to 1.0 inches; ⅛ to 1.0 inches; and/or 1/16 to 4.0 inches. Continuous and constant offset surfaces for certain composite laminate structures 100 avoid jagged edges and/or minimize delamination risks. Variable and/or discontinuous offset surfaces, though, may enable creation of complex tapering surfaces for other composite laminate structures 100, although the risk of error becomes heightened.

Further details regarding card sliding and other tapering techniques may be gleaned from International Publication No. WO 2021/188783, the contents of which as are incorporated herein by reference in their entirety.

2. Utilization of Finite Length Tapes for Grid Construction

Figure 3B:
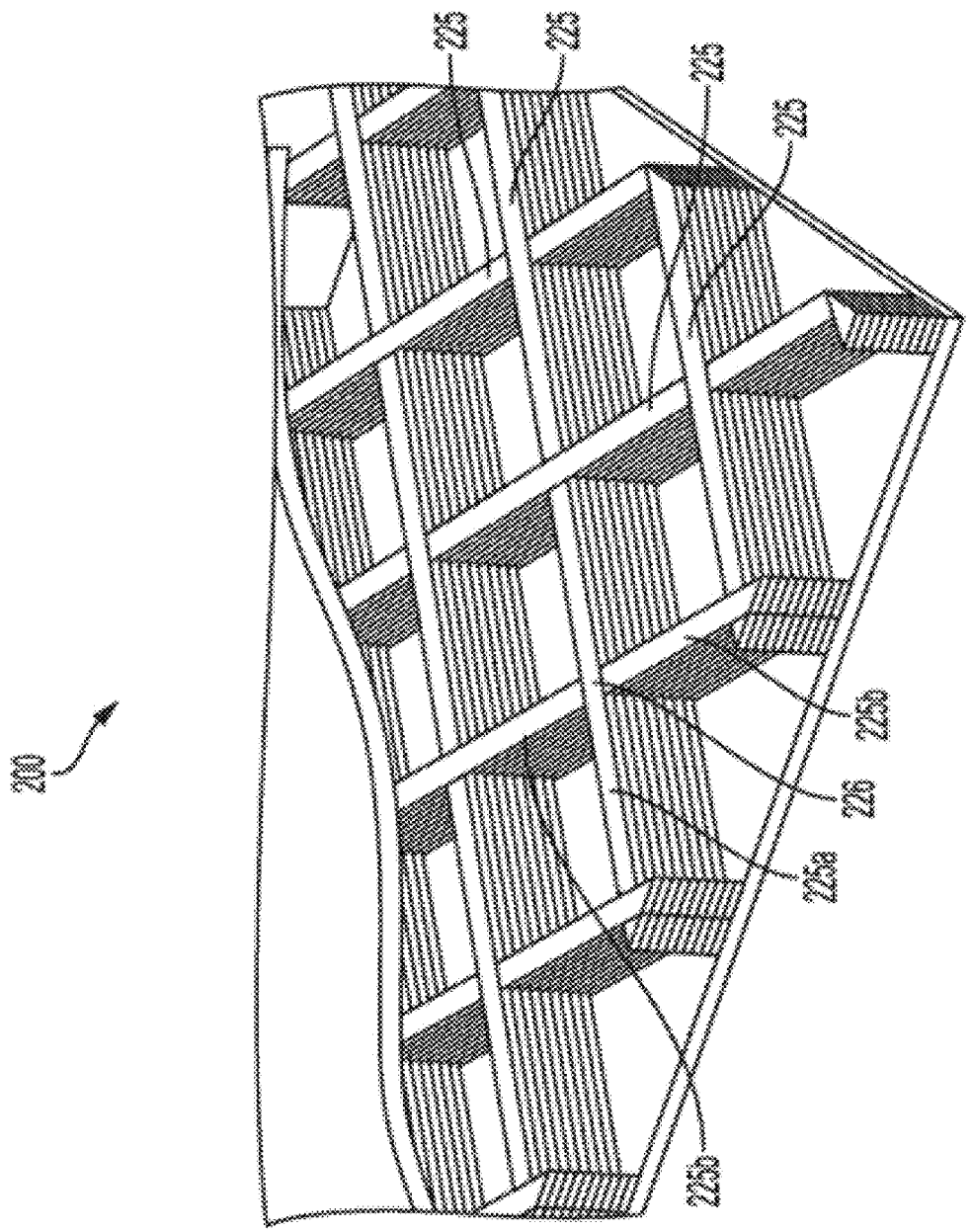
FIG. 3B shows a grid and skin construction formed using finite length (i.e., discontinuous) tape constructions.

In FIG. 3B a configuration is illustrated that uses prefabricated discontinuous (i.e., finite length) tapes 225, which may be staggered for use in all directions and for all ribs of any desired laminate structure 200, including grid, grid/skin, and/or grid/core/skin structures. As a non-limiting example, each finite length tape 225 may have a length approximately twice that provided between adjacent joints, accounting for the width of the tape itself, as may be understood also from FIG. 7. Stated otherwise, in certain embodiments the length of each finite length tape 225 may be (2L−b), with (L) being the length or size of the grid (i.e., between each adjacent joint) and (b) being the width of tape 225. Thus, as a non-limiting example, if the joints are spaced at 10 inches apart and the tapes are 1 inch wide, each finite length tape would be 19 inches long. As another non-limiting example, if the joints of a grid are spaced at 5 inches apart and the tapes are 1 inch wide, each finite length tape would be 9 inches long. Any of a variety of lengths may be envisioned; still further finite length tapes of differing lengths may be utilized in different layers of a grid/skin structure. As one example, the lengths may be longer for the skin, as compared to the grid layers.

Remaining with FIG. 3B, the discontinuous or finite length tapes 225 may be stacked in a staggered pattern, so the number of discontinuities may remain the same as the conventional stacking sequence but be more evenly distributed across an entirety of a composite laminate. For example, in the uppermost layer of tapes 225 illustrated in FIG. 3B, joint location 226 is defined only by respective ends of finite length tapes 225*b*. Crossing this joint location 226 is a continuous finite length tape 225*a*, whereby—at least as illustrated—a midpoint of tape 225*a* corresponds approximately to the joint location 226. Stated otherwise, joint location 226 is defined by only two ends of two adjacently positioned tapes 225 and overlaid by a midpoint of a third adjacently positioned tape 225. In at least the illustrated embodiment, the third tape 225*a* is oriented substantially perpendicular to the remaining two tapes 225*b*. It should be understood, though, that as detailed elsewhere herein, angles between the tapes may vary. As a result, end structure for the tapes 225 may likewise vary, differing for example from the normal (i.e., right angle) orientation of the end relative to a length of the tape, as illustrated in FIG. 3B.

From FIG. 3B, it may also be understood that any joint location 226—relative to three layers of plies established using continuous finite length tape 225—will have a joint discontinuity only in one (or only in two, depending on the sequencing involved) of the three layers. Notably, where ply 225*a* provides continuity across joint location 226, in the layer below a ply 225b may provide the same, thus resulting in a configuration whereby gaps 227 are provided between adjacent joints or joint locations 226. From this, it may thus be understood that an exemplary and non-limiting advantage of using finite-length discontinuous tape 225 is that the tapes can be prefabricated and stacked in a dispenser, thereby facilitating building of grid structures, as detailed elsewhere herein. Further details regarding finite length tapes may be gleaned from International Publication No. WO 2020/252126, the contents of which as are incorporated herein by reference in their entirety.

3. Octogrid Structures and Applications Therefor

Figure 4:
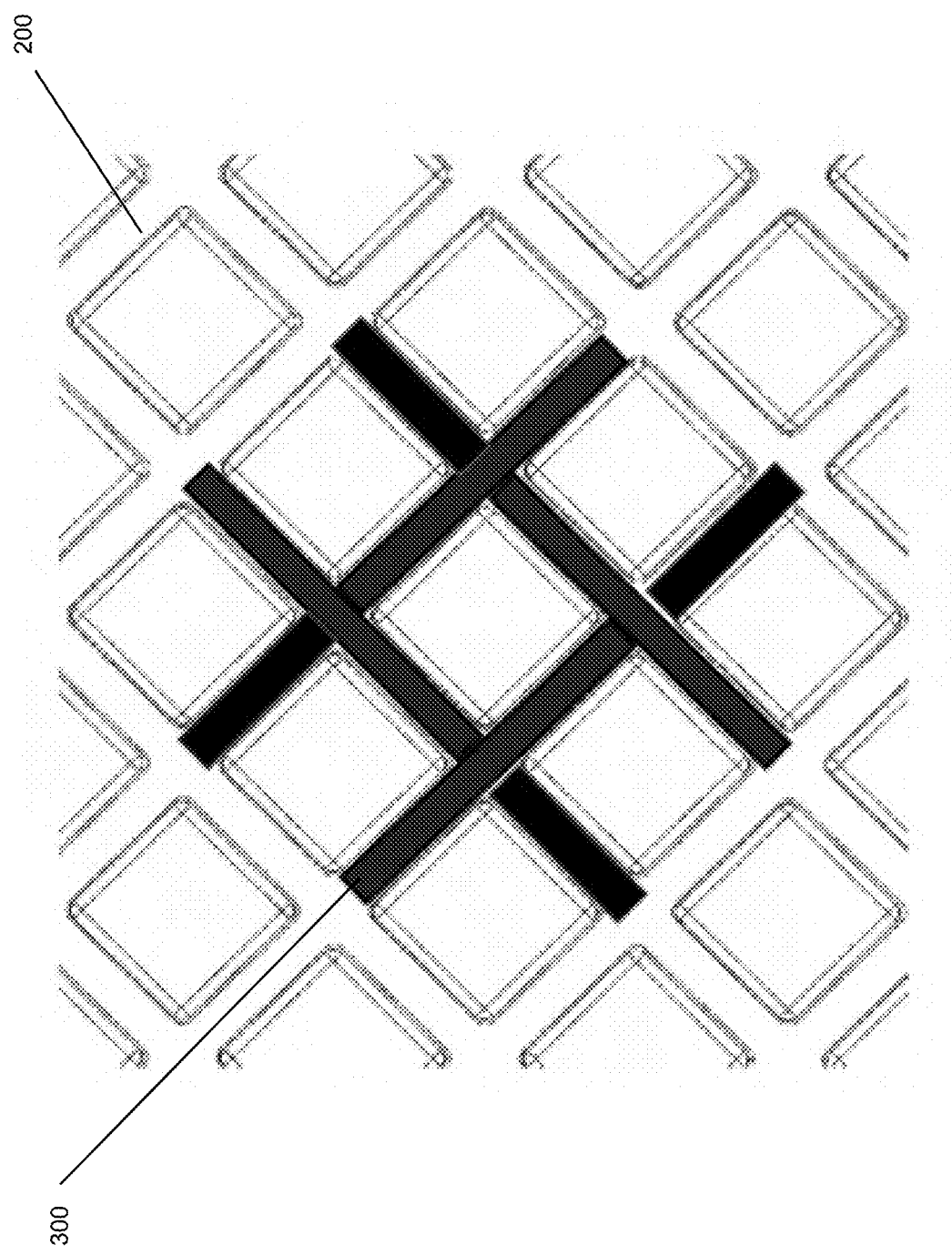
FIG. 4 shows an octogrid structure according to various embodiments, as may be extracted or cut from a multi-cell square grid.
Figure 5:
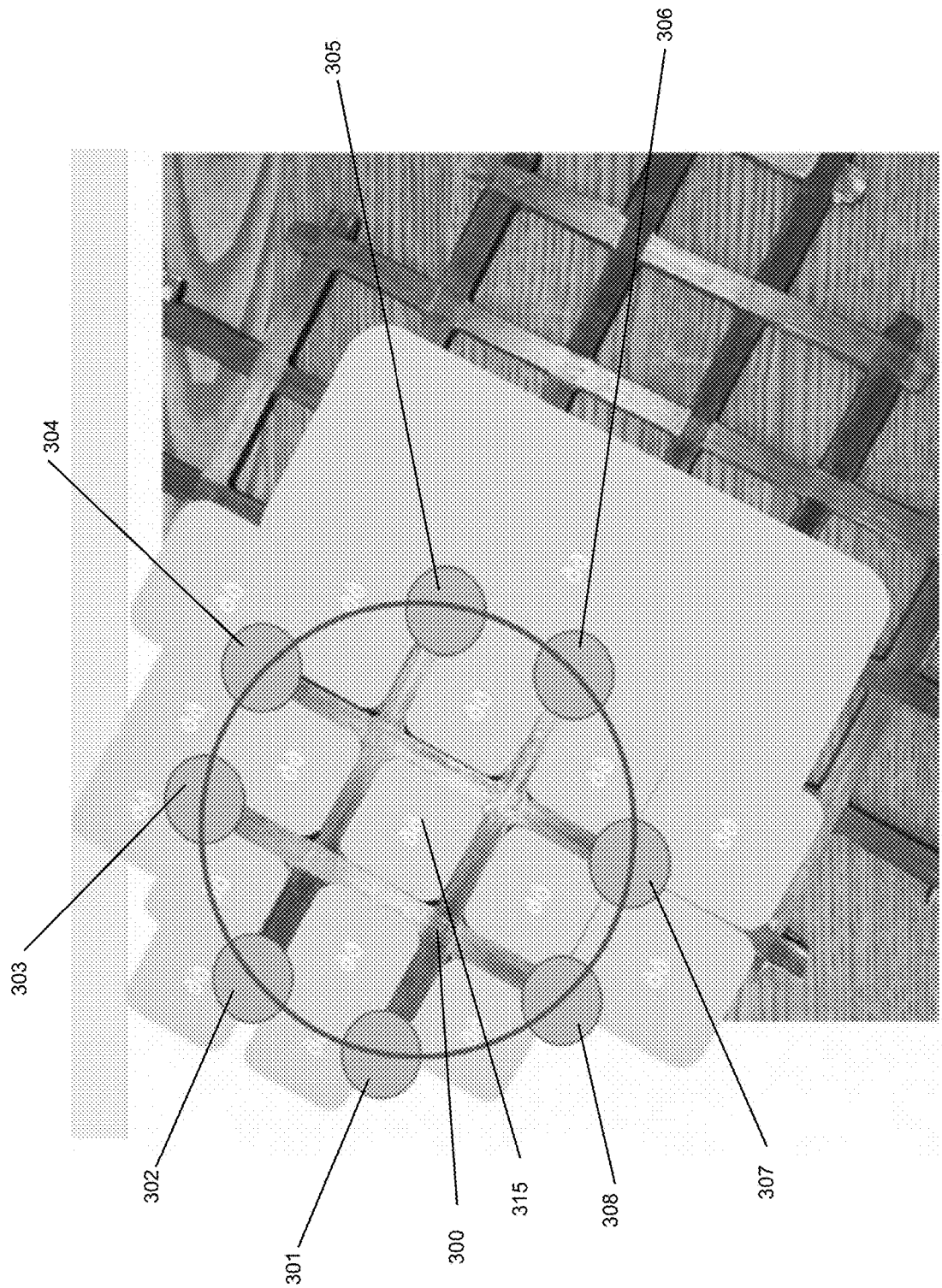
FIG. 5 shows an overlay of the octogrid structure of FIG. 4, with discrete branch points annotated.

Via the various embodiments described herein, an octogrid structure 300 such as that illustrated in FIG. 4 may be extracted or cut from a multi-cell square grid, such as the type utilized in forming grid and/or grid-skin combined structures as seen, for example, in FIG. 3B. So configured, with reference to FIG. 5, the double-double constructed octogrid structure 300 may define a plurality of branches 301-308 with distinct end points. These branches may, in certain embodiments, surround a centralized square grid 315, which may be coreless if desired. In certain embodiments, as illustrated in FIG. 5, a length of each branch 301-308 may be defined, in part, by a strut portion that is the same length as a respective side of the square grid 315. In other embodiments, as may be understood with reference to FIG. 10, described elsewhere herein, the branch length may be greater than that of the centralized square grid 315.

Figure 6B:
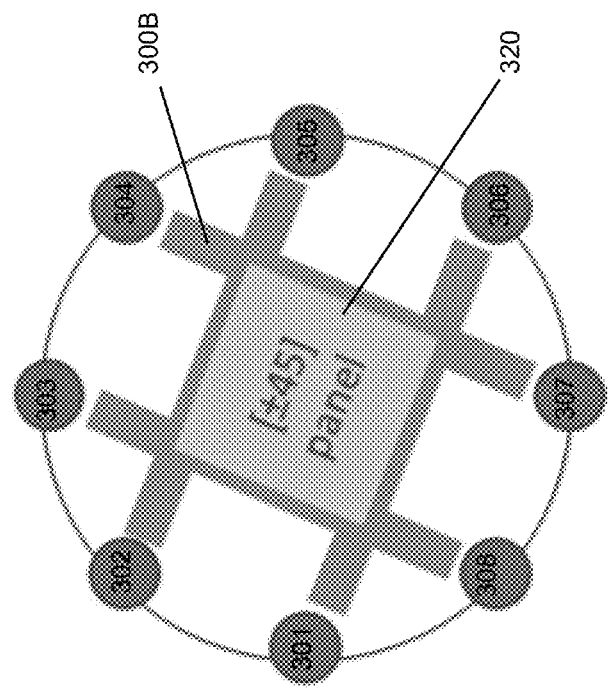
FIG. 6B shows an octogrid structure configured for propeller motor support according to various embodiments.
Figure 6A:
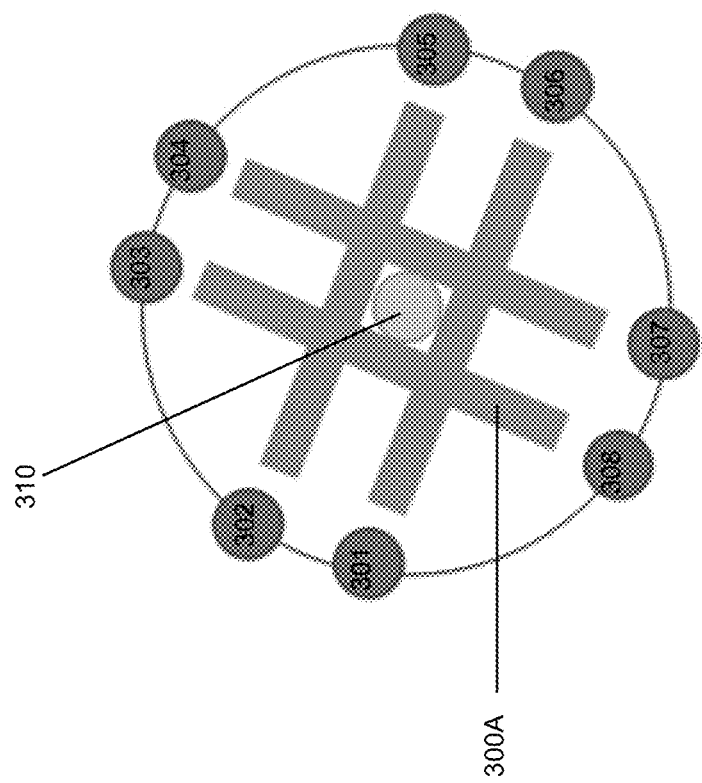
FIG. 6A shows an octogrid structure configured for propeller blade support according to various embodiments.
Figure 14:
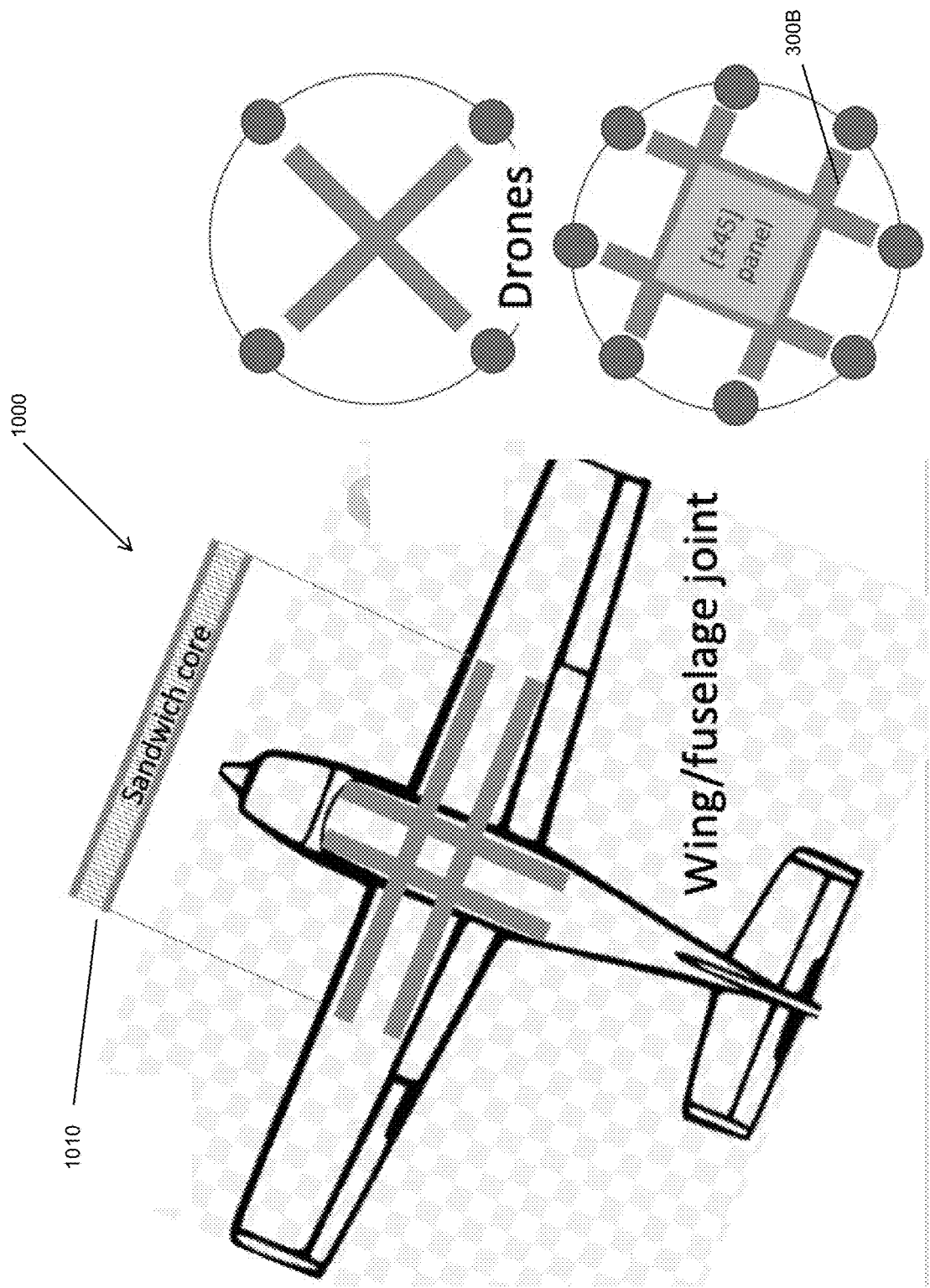
FIG. 14 shows an exemplary application of the octogrid structures of various embodiments, further incorporating a sandwich core feature.

Certain exemplary configurations of the octogrid structure 300 of FIGS. 4-5 may be further understood with reference to FIGS. 6A-B. In the first, FIG. 6A, there is illustrated an octogrid structure 300A configured specifically for support of a propeller blade (see also FIG. 10). By way of comparison to FIGS. 5 and 6B, it may be seen in FIG. 6A that the blade-configured octogrid structure 300A may have branches 301-308 that are longer in length as compared to sides of its centralized square grid. A core or shaft 310 may thus fit within this reduced-size central core. This may be intentional, so as to support a centralized blade shaft or otherwise; in this regard, the spacing/size of the centralized square grid may be adjustable and/or different from that of the branch struts or the like. This, amongst various advantages, facilitates support via embodiments of the octogrid structure 300A of blades, such as that of FIG. 10 (e.g., propeller or windmill or the like), with slender and long profiles. Another non-limiting application may be the wing/fuselage joint configuration 1000 illustrated in FIG. 14, described elsewhere herein.

In FIG. 6B another embodiment of the octogrid structure 300B is illustrated, whereby oppositely it may be understood that the centralized square grid (see grid 315 of FIG. 5) may be enlarged relative to lengths of the respective branches 301-308. This may be desirable, as a non-limiting example, for support of propeller motors for drones or the like. This structure 300B may, in certain embodiments, have a centralized square grid 320 that includes a ±45° ply panel for increased stiffness. In these and other embodiments, respective [0/90] joints may be provided within the grid, while the various ply layers defining the grid (as described elsewhere herein) may be formed from any of the available sub-laminate modules associated with double-double configurations, as also described elsewhere herein.

Returning momentarily to FIG. 14, with respect to the wing/fuselage joint configuration 1000 illustrated therein, the octogrid structure 300B may prove advantageous, although dependent on relative wing/fuselage dimensions, the structure 300A may be beneficial. In either scenario, it should be understood that multiple layers formed from either structures 300A/B (or other octogrid structures described herein) may be layered relative to one another with an intermediate sandwich core 1010, as evident from FIG. 14. In this manner, alternative laminate structures can form the core, while the octogrid structures define opposing skins or outer layers of an resulting composite laminate structure.

Figure 7A:
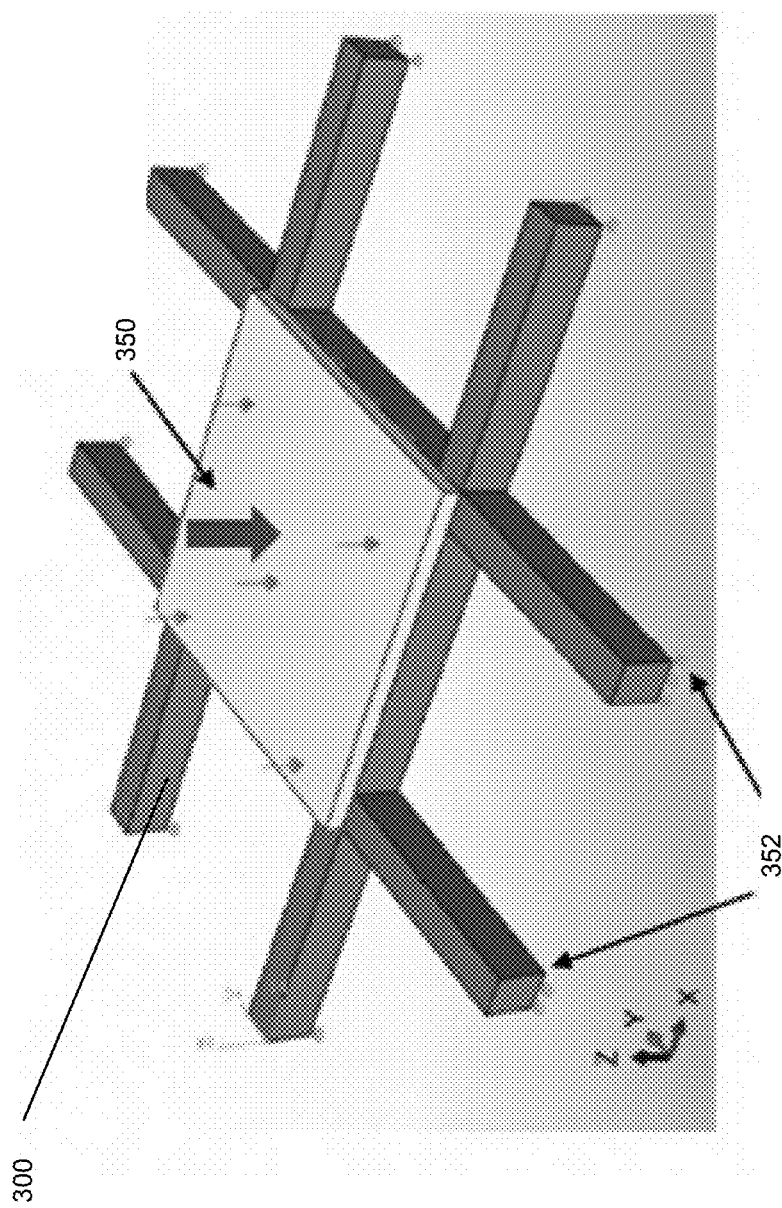
FIGS. 7A-B show exemplary displacement, and modelling thereof, for the octogrid structure of FIG. 6B, subjected to a uniformly distributed load according to various embodiments.

FIG. 7A illustrates the achievable stiffness and rigidity achievable via the octogrid structure 300 (and similarly structures 300A and 300B) according to various embodiments. Specifically, with imposition of a uniformly distributed load 350 (e.g., 1000 N), a displacement 352 of the branches 301-308 (see FIGS. 5-6B) is observed. This is also visualized and valued in the model 400 depicted in FIG. 7B, whereby deflection of the grid ribs under distinct loads is evident. For example, with a uniformly distributed load at center with simply supported conditions at the ribs, a weight of 0.418 kg was measured for the grid 300, with FPF (first ply failure) load of 5520 N and associated deflection of 7.56 mm, and LPF (last ply failure) load of 14061 N and associated deflection of 21.78 mm. Respective points 410, 420 of least and most deflection, subject to load 350 are also evident in FIG. 7B.

Figure 7B:
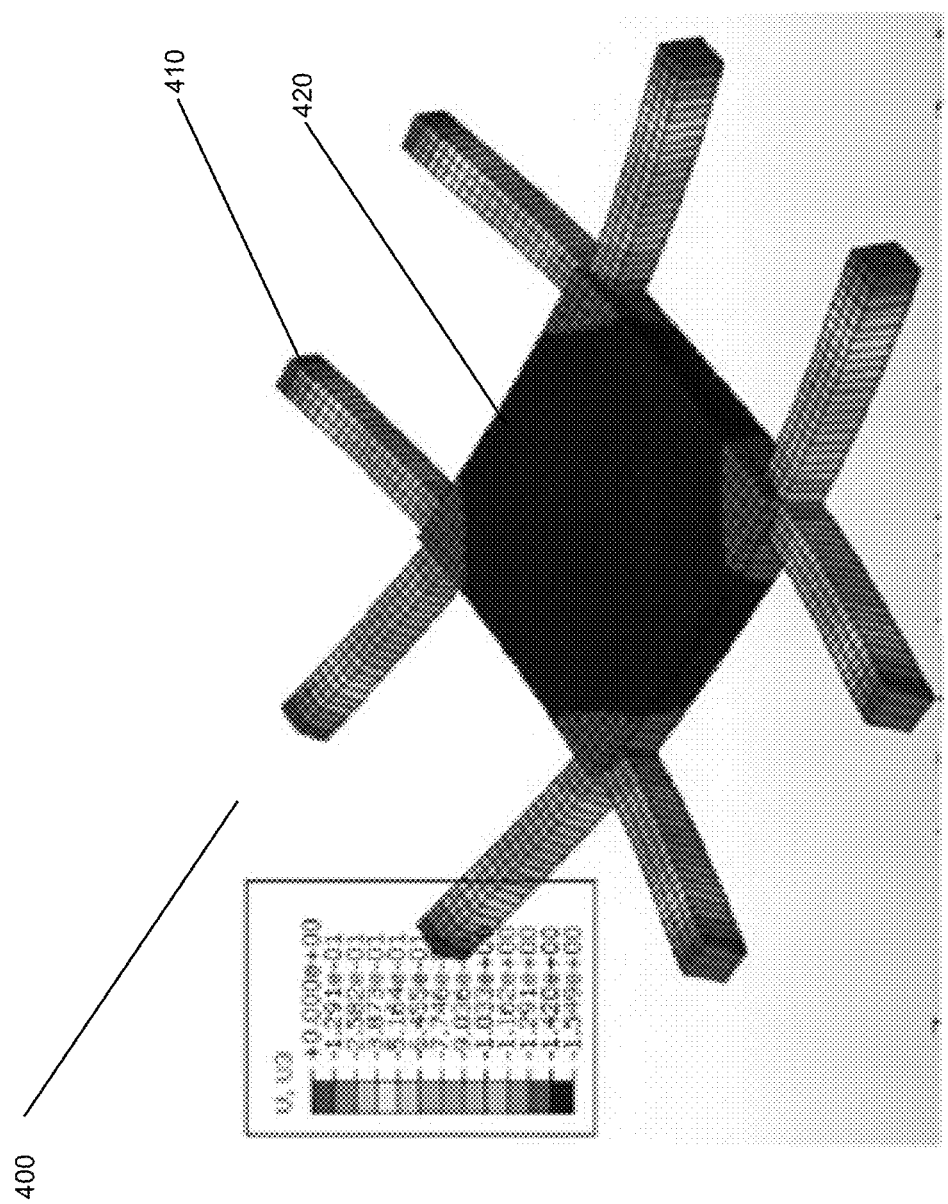

Notably, as compared to conventional cantilever grid structures (not illustrated), the octogrid structure 300 analyzed in FIGS. 7A-B demonstrated improved characteristics. For example, a deflection of 1.37 mm per 1000 N of load was achievable via octogrid, versus 1.34 mm for a cantilever grid with matching bending stiffness. For this comparison, both octogrid and cantilever grid had the same span width for different branches, with the same outer radius (see discussion of span width or branch length elsewhere herein). Still further, the cantilever grid under the same conditions as octogrid weighed 0.539 kg, a 29% increase relative to that achievable (i.e., more lightweight construction) via octogrid. FPF load for cantilever grid was also less optimized than octogrid, measured at 3335 N with 4.47 mm of deflection. Similarly, for LPF, cantilever grid withstood only an 8055 N load with 13.25 mm of deflection. Thus, via the octogrid constructions according to various embodiments herein, increased loads with more deflection can be supported.

Figure 8:
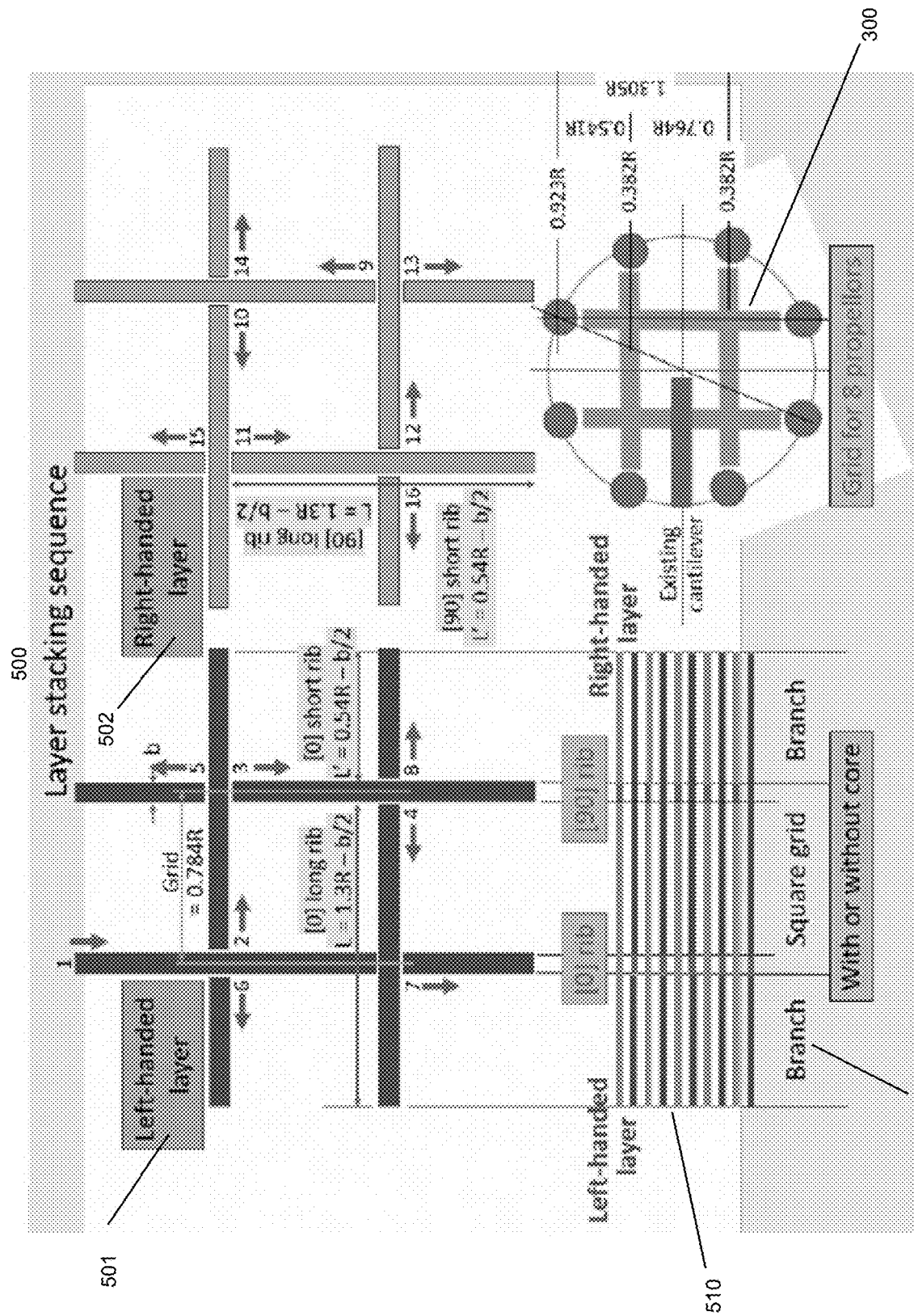
FIG. 8 shows an exemplary layer stacking sequence for discrete left- and right-hand layers of an octogrid structure according to various embodiments.
Figure 9:
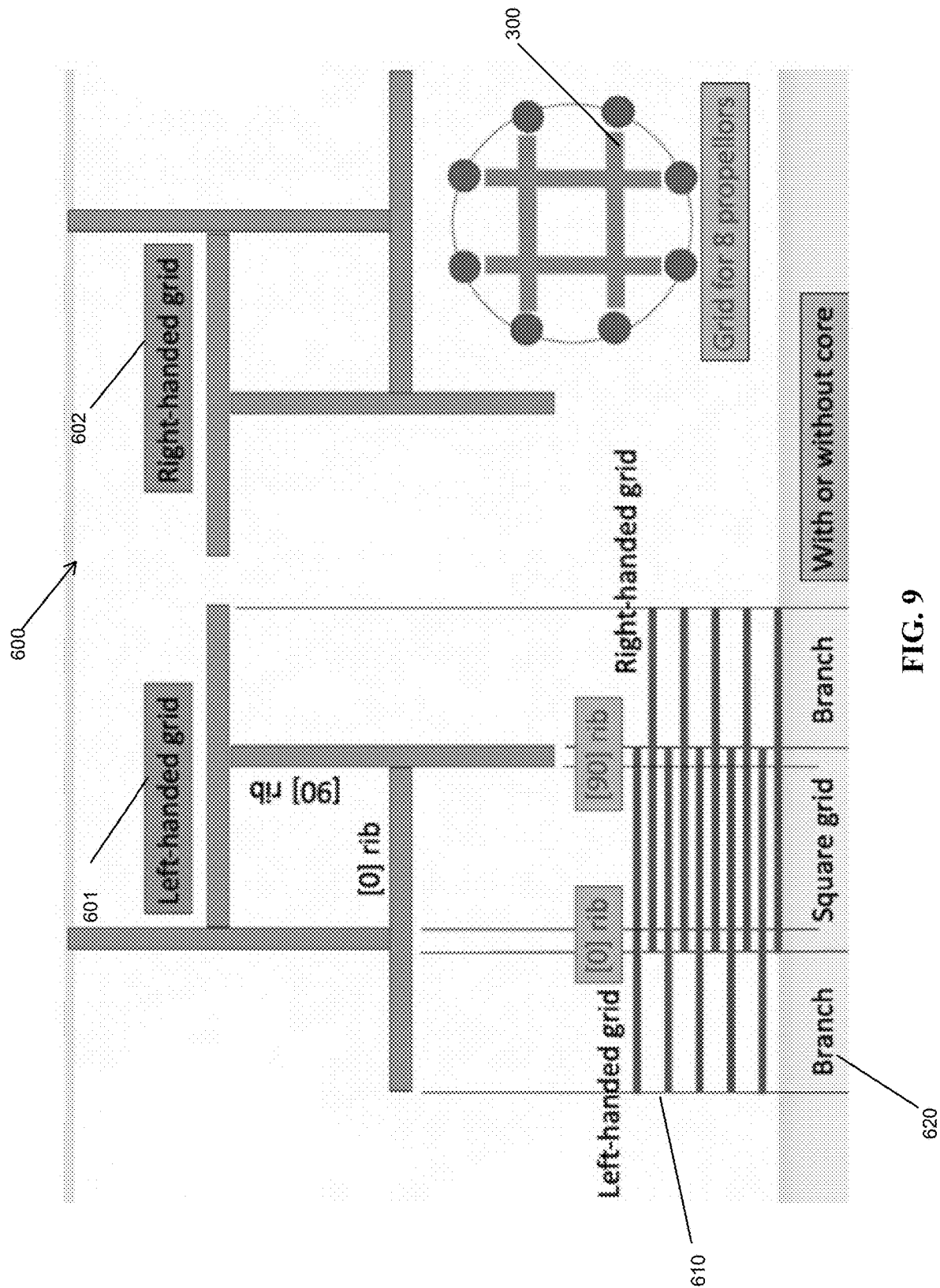
FIG. 9 shows an exemplary layer stacking sequence for discrete left- and right-hand grids of a tapered octogrid structure according to various embodiments.

Turning to FIGS. 8-9, firstly in combination, illustrated in detail therein are two distinct layer stacking sequences 500, 600, according to various embodiments of the octogrid structures 300 (and 300A/300B) described herein. It should be understood that any of these octogrid structures 300 may be formed, on an individual ply layer from any of the various stacking sequences and ply angle selections described previously herein and/or in any of the prior art disclosures incorporated by reference herein. What is significant in the stacking sequences 500, 600 of the octogrid structures 300 is not solely the play layer sequences, but the staggered left- and right-handed layers that each distinct octogrid ply group may define relative to one another.

With reference specifically to FIG. 8, stacking sequence 500 may be understood therefrom, including a left-handed layer 501 and a right-handed layer 502, respectively. Starting with the left-handed layer 501, a long rib 1 is first laid down, followed by long ribs 2-4. Thereafter, short ribs 5-8 are laid down in the pattern illustrated. The left-handed nature of layer 501 may be understood by the first rib 1 being on the left (facing) side of the octogrid structure 300 that may be defined therefrom. The right-handed layer 502 is the reverse, whereby long rib 9 is first laid down, on the right (facing) side of the structure, followed by long ribs 10-12 and concluding with short ribs 13-16. Notably, each layer has eight distinct ribs (i.e., octogrid structured). In the lower-left portion of FIG. 8, a cross-sectional view of a thickness of the octogrid structure 510 formed from each octogrid layer 501, 502 may be seen. The centralized square grid (see also grid 315 of FIG. 5) is thus defined, with opposing or outwardly extending branches 520.

As mentioned elsewhere with respect to FIGS. 4-5, utilizing finite length strips (i.e., long and short ribs), results in non-adjacent [0/90] joints, which may be seen in alternating left/right positions in the grid for each distinct layer. This improves stiffness and rigidity for the ribs and resulting octogrid layers 501/502 and octogrid structures 300 (300A/B) built therefrom. It should be understood as well that the octogrid structure 510 may be formed with or without a core, as detailed elsewhere herein. Further, although exemplary dimensions for lengths of the respective long and short ribs are provided in FIG. 8, it should be understood that additional or alternative lengths may be desirable for certain applications, at least in part with the rib lengths defining respective grid span widths, also as described elsewhere herein.

With reference specifically to FIG. 9, stacking sequence 600 may be understood therefrom, including a left-handed layer 601 and a right-handed layer 602, respectively. Starting with the left-handed layer 601, as compared with layer 501, only four long ribs are laid down in this configuration. The right-handed layer 602 is the reverse or mirror image of layer 601, also with only four long ribs (no short ribs) laid down in this configuration. Together, when stacked adjacent relative one another to form an octogrid structure 610, a set of layers 601, 602 contains eight long ribs. In the lower-left portion of FIG. 9, a cross-sectional view of a thickness of the octogrid structure 610 formed from each octogrid layer 601, 602 may be seen. Compared to structure 510, a thinner or tapered structured is formed, with spacing between each sequential ones of the left-handed grids 601 or right-handed grids 602. Thus, as compared to the layup 500, the octogrid structure 610 may realize further weight savings, without loss of stiffness and/or strength characteristics that are desirable.

As with structure 510, the octogrid structure 610 may include a centralized square grid (see also grid 315 of FIG. 5), with opposing or outwardly extending branches 620. An alternating sequence is also provided relative to non-adjacent [0/90] joints, as also evident in FIG. 9. As previously mentioned, this minimizing of adjacent discontinuities improves stiffness and rigidity for the ribs and resulting octogrid layers 601/602 and octogrid structures 610 (like structures 300 (300A/B)) built therefrom. It should be understood as well that the octogrid structure 610 may also be formed with or without a core, as detailed elsewhere herein. Further, although exemplary dimensions for lengths of the ribs are not provided in FIG. 9, it should be understood that they may be selected as desirable, substantially the same (or different) than those annotated in FIG. 8 and discussed previously herein.

Figure 10:
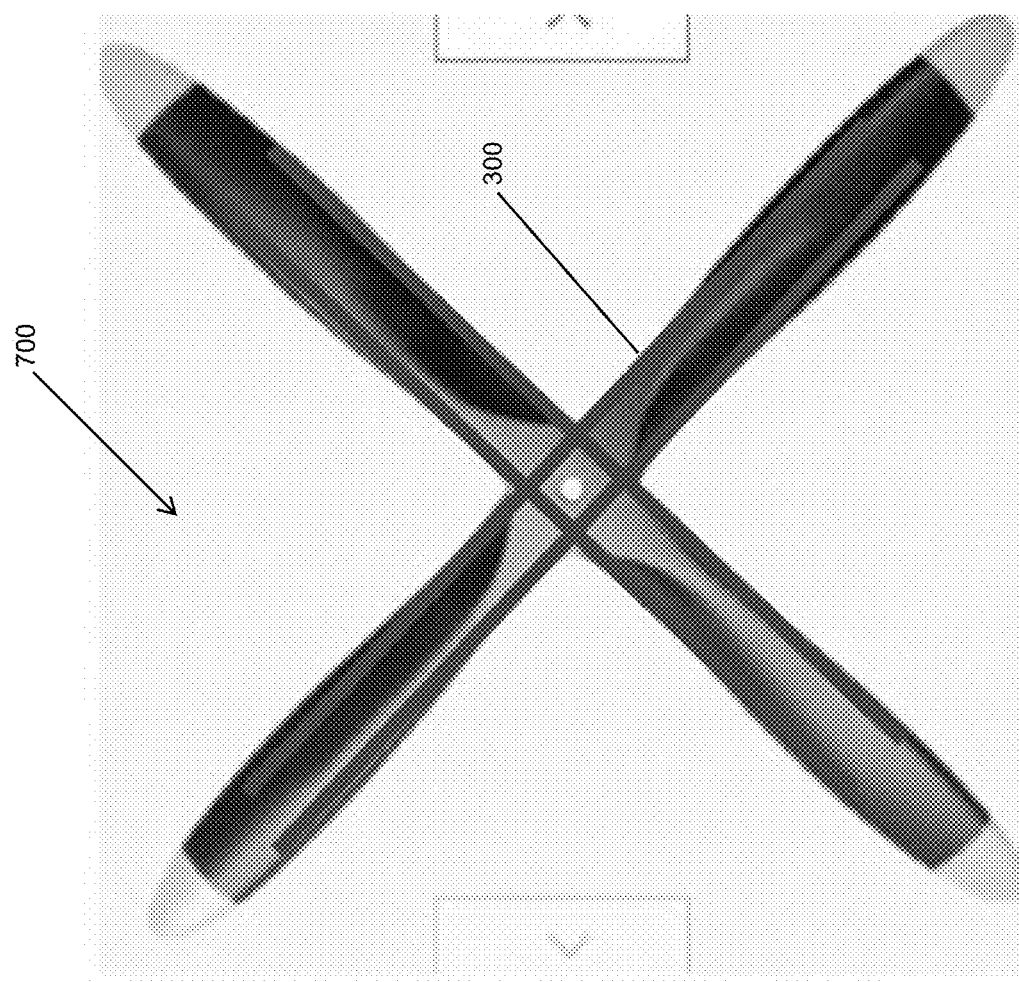
FIG. 10 shows an exemplary application of the octogrid structures of various embodiments with respect to a propeller blade construction.
Figure 11:
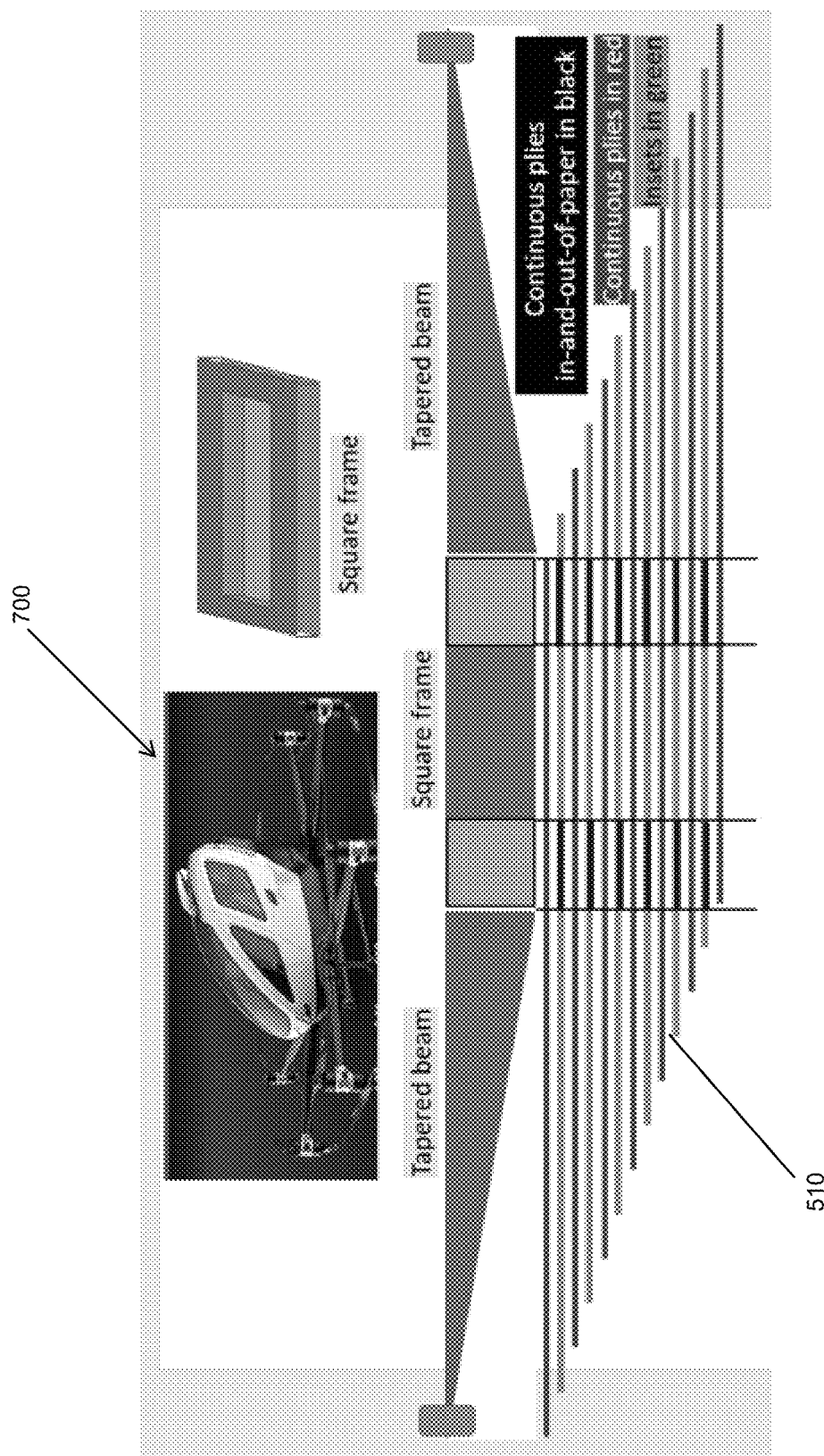
FIG. 11 shows an exemplary application of the octogrid structures of various embodiments to a drone blade with included (optional) tapering.

In FIGS. 10-11 there is illustrated an exemplary application for drone 700 blades, utilizing the octogrid structure 300 (or 300A/B). In FIG. 11 particularly, it may be understood that the drone blade may also be formed using the stacking sequence 500 that results in an octogrid structure 510, having alternating (i.e., non-adjacent) [0/90] joints and a centralized square frame or grid. By way of comparison to the structure illustrated in FIG. 8, it should be understood that according to various embodiments, the stacking sequence 500 may be further formed utilizing the card-shifting techniques described elsewhere herein (and as incorporated by reference), such that a variable thickness (and associated opposing tapering at end of blades) is provided. In this manner additional weight savings may be realized according to various embodiments, as compared to an octogrid structure lacking tapering of any sort.

Figure 12:
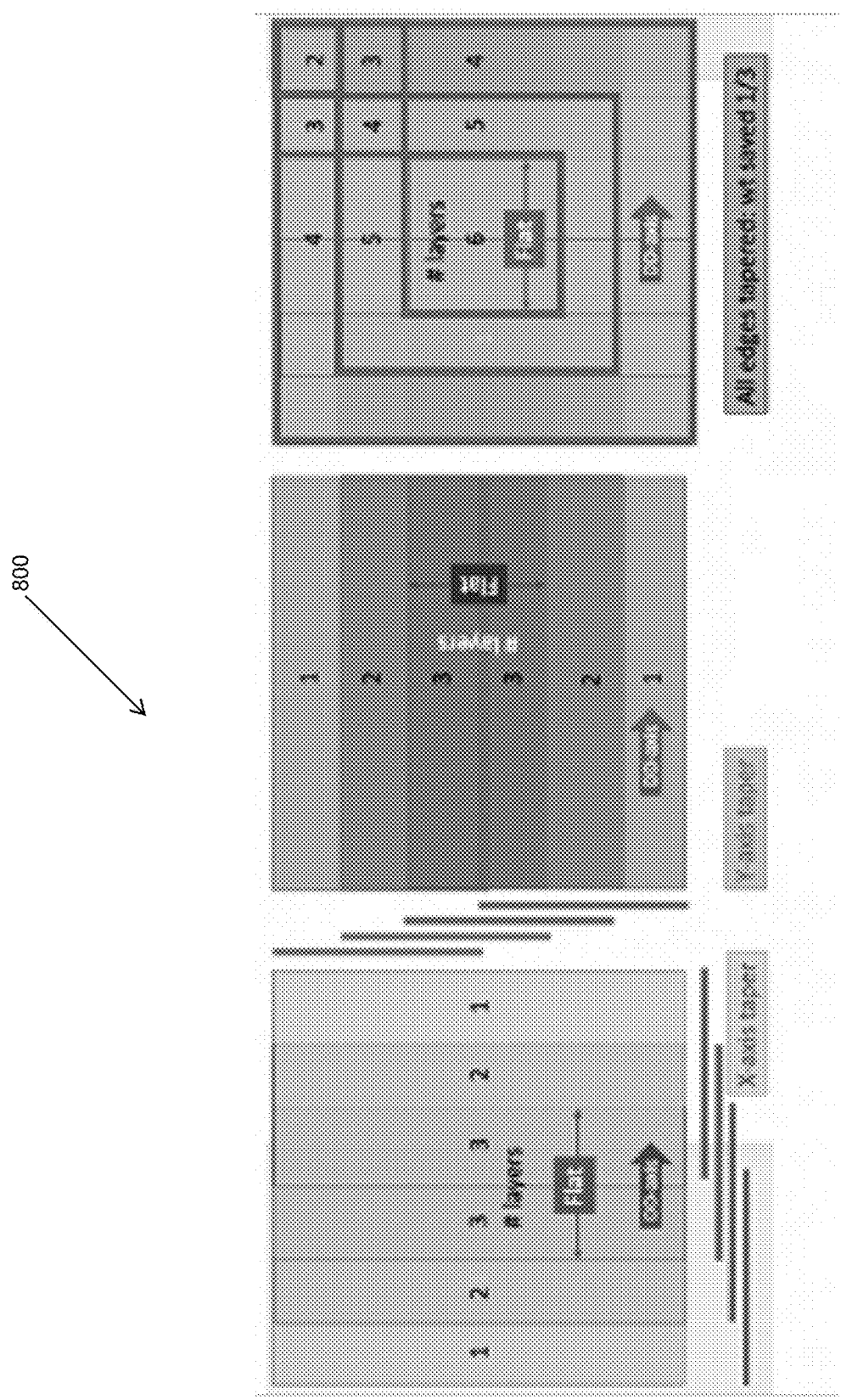
FIG. 12 shows further tapering options, in respective axes (see also FIG. 7A), for the octogrid structures of various embodiments.
Figure 13:
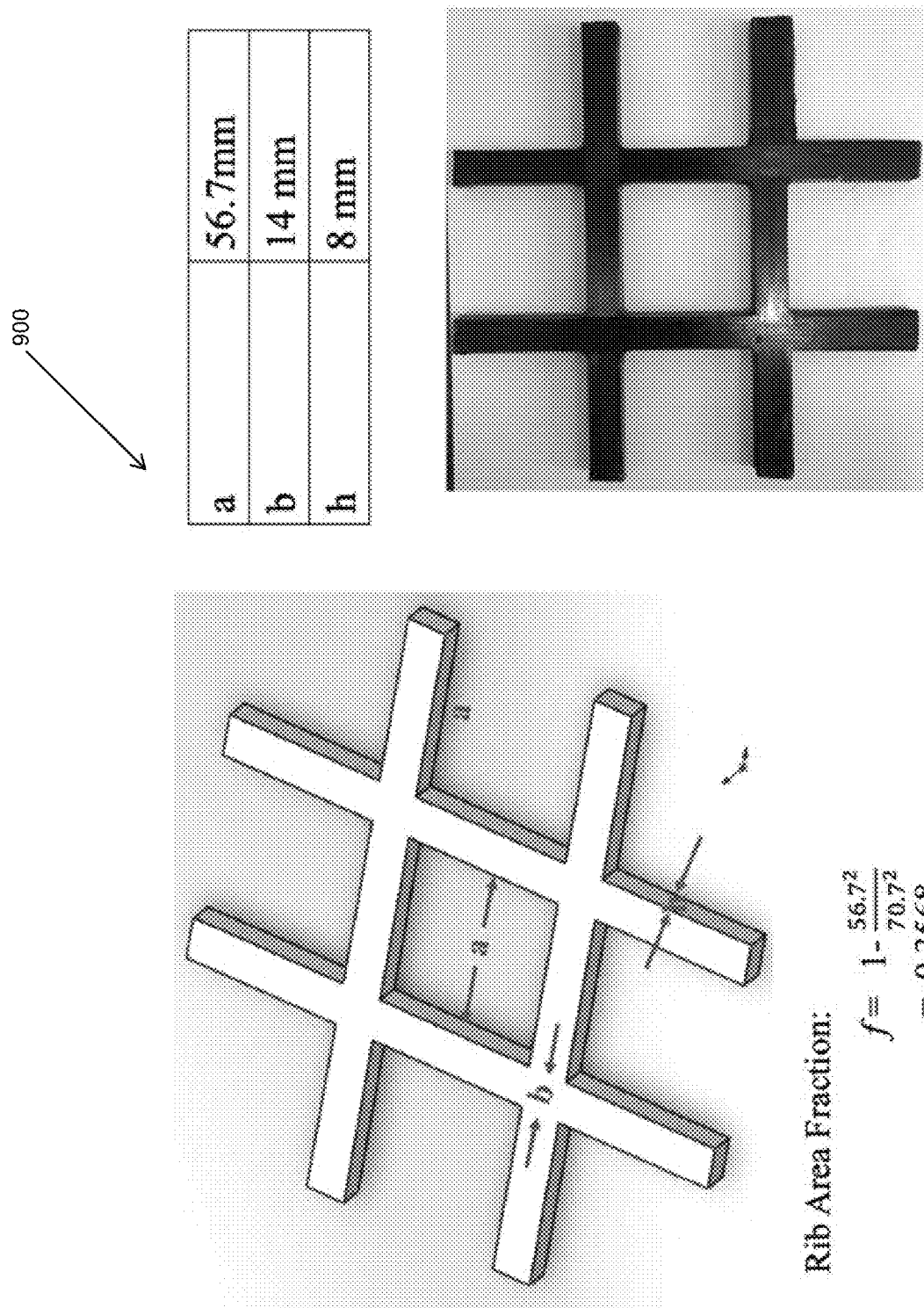
FIG. 13 shows exemplary dimensions and rib area fraction calculations for the octogrid structures of various embodiments.

FIGS. 12 and 13 provide further details for octogrid structures (sub-structures and/or discrete layers as well) according to various embodiments. In FIG. 12 particularly, discrete options for tapering in respective axes (see also FIG. 7A) may be understood, with multi-axis, all-edge tapering realizing a weight savings of 33% as compared to conventional grid or cantilever structures. From FIG. 13, exemplary dimensions for the octogrid structures (sub-structures and/or discrete layers as well) according to various embodiments may be seen, in a non-limiting fashion. Rib area fraction can be calculated as shown, with dimension (a) in particular of the centralized square grid being adjustable, as described elsewhere herein.

Exemplary Applications and Advantages Realized

While throughout herein focus has been on exemplary applications for propellers or blades (e.g., on drones or wind turbines or the like), it should be understood that the various octogrid structures described have additional or alternative uses, including for pressure vessels, wings, fuselages, cylinders, rockets, drones, and wind turbine components beyond blades per se).

Still further, exemplary and non-limiting advantages of various embodiments of the staggered stacking sequences described herein thus include, as mere non-limiting examples, at least the following:

(1) One of the most important advantages is the use of finite-length strips to produce the center grid from which 8 branches are anchored. The height of the branches and the grid are the same because of the inserts that allow the height of the branches to match that of the joints in the grid. With these inserts, compaction of the composites can be uniform and good quality ensured. In addition, the joints will be better aligned with the continuous strips and discontinuous inserts. Joints are the weakest point. Such good alignment is critical to ensure the quality of the strength of the joints.

(2) The ability to add shear rigidity with [±45] panel bonded to the opening of the center square grid is also critical in providing a solid foundation for the 8 branches to be joined together.

(3) The ability to taper the branches can reduce the weight without loss of significant stiffness and strength of each branch is an excellent application of the card sliding technique (4) The octogrid can be produced with robotic arms that can place each long and short strips in prescribed order. It can also be produced by an innovative method used in the development of our first grid with inserts.

(5) The hub for propellers and wind turbine blades can also be replaced by octogrid with extended branches to serve as spars. Significant weight and cost reductions are possible with spars the go through the center of the joints. The branches of octogrid can be [0] or double-double to provide a balance between bending and twisting.

CONCLUSION

Of course, many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An octogrid sub-structure for use in forming a composite laminate structure, the octogrid sub-structure comprising:
   a first ply layer comprising a plurality of first elongate tapes oriented in a first direction and a plurality of second elongate tapes oriented in a second direction, the second direction being offset from the first direction at an approximate right angle; and
   a second ply layer comprising a plurality of third elongate tapes oriented in the first direction and a plurality of fourth elongate tapes oriented in the second direction, the second ply layer being overlaid atop the first ply layer,
   wherein:
      each of the plurality of first, second, third and fourth elongate tapes comprises a first set of ply layers and a second set of ply layers offset from the first set of ply layers by an angle of at least 25 degrees;
      a first end of each of the plurality of first, second, third and fourth elongate tapes is positioned approximately adjacent a midpoint of an adjacently positioned one of the plurality of first, second, third and fourth elongate tapes; and
      a second and opposing end of each of the plurality of first, second, third and fourth elongate tapes extends freely beyond a central grid portion defined by a length of a portion between the first end and the midpoint of a portion of the plurality of first, second, third and fourth elongate tapes.

2. The octogrid sub-structure of claim 1, wherein:
   a first subset of each of the plurality of first, second, third and fourth elongate tapes has a first length; and
   a second subset of each of the plurality of first, second, third and fourth elongate tapes has a second length less than the first length.

3. The octogrid sub-structure of claim 2, wherein the second length is half the first length.

4. The octogrid sub-structure of claim 1, wherein the second and opposing end of each of the plurality of first, second, third, and fourth elongate tapes has at least one tapered surface.

5. The octogrid sub-structure of claim 1, wherein with the second ply layer being overlaid atop the first ply layer, the first ends of each of the plurality of first and second elongate tapes are offset a distance from the first ends of each of the plurality of third and fourth elongate tapes.

6. The octogrid sub-structure of claim 5, wherein the offset distance is equal to a span distance defined by the central grid portion.

7. The octogrid sub-structure of claim 1, wherein:
   a sum of the plurality of first and second elongate tapes define eight distinct ribs of the first ply layer of the octogrid sub-structure; and
   a sum of the plurality of third and fourth elongate tapes define eight distinct ribs of the second ply layer of the octogrid sub-structure.

8. The octogrid sub-structure of claim 1, wherein:
   a sum of the plurality of first and second elongate tapes define no more than four distinct ribs of the first ply layer of the octogrid sub-structure; and
   a sum of the plurality of third and fourth elongate tapes define no more than four distinct ribs of the second ply layer of the octogrid sub-structure.

9. The octogrid sub-structure of claim 8, wherein a length of all the plurality of first, second, third, and fourth elongate tapes is the same.

10. The octogrid sub-structure of claim 1, wherein the first end of each of the plurality of first, second, third and fourth elongate tapes is positioned at the midpoint of the adjacently positioned one of the plurality of first, second, third and fourth elongate tapes.

11. A composite octogrid structure for use in a composite laminate structure, the octogrid structure comprising:
   a plurality of first ply layers each comprising a plurality of first elongate tapes oriented in a first direction and a plurality of second elongate tapes oriented in a second direction, the second direction being offset from the first direction at an approximate right angle; and
   a plurality of second ply layers each comprising a plurality of third elongate tapes oriented in the first direction and a plurality of fourth elongate tapes oriented in the second direction,
   wherein:
      the plurality of first and second ply layers are overlaid relative to one another in an alternating fashion so that a first ply layer is intermediate any sequential second ply layers and vice-versa;
      each of the plurality of first, second, third and fourth elongate tapes comprises a first set of ply layers and a second set of ply layers offset from the first set of ply layers by an angle of at least 25 degrees;
      a first end of each of the plurality of first, second, third and fourth elongate tapes is positioned approximately adjacent a midpoint of an adjacently positioned one of the plurality of first, second, third and fourth elongate tapes; and
      a second and opposing end of each of the plurality of first, second, third and fourth elongate tapes extends freely beyond a central grid portion defined by a length of a portion between the first end and the midpoint of a portion of the plurality of first, second, third and fourth elongate tapes.

12. The composite octogrid structure of claim 11, wherein:
   a first subset of each of the plurality of first, second, third and fourth elongate tapes has a first length; and
   a second subset of each of the plurality of first, second, third and fourth elongate tapes has a second length less than the first length.

13. The composite octogrid structure of claim 11, wherein the second and opposing end of each of the plurality of first, second, third, and fourth elongate tapes has at least one tapered surface.

14. The composite octogrid structure of claim 13, wherein the at least one tapered surface is on opposing sides of each of the first and second ply layers, respectively.

15. The composite octogrid structure of claim 11, wherein with the respective second ply layers being overlaid atop the respective first ply layers, the first ends of each of the plurality of first and second elongate tapes are offset a distance from the first ends of each of the plurality of third and fourth elongate tapes.

16. The composite octogrid structure of claim 11, wherein:
   a sum of the plurality of first and second elongate tapes define eight distinct ribs of each of the first ply layers; and a sum of the plurality of third and fourth elongate tapes define eight distinct ribs of each of the second ply layers.

17. The composite octogrid structure of claim 11, wherein:
   a sum of the plurality of first and second elongate tapes define no more than four distinct ribs of each of the first ply layers; and
   a sum of the plurality of third and fourth elongate tapes define no more than four distinct ribs of each of the second ply layers.

18. The composite octogrid structure of claim 17, wherein a length of all the plurality of first, second, third, and fourth elongate tapes is the same.

19. The composite octogrid structure of claim 18, wherein a first gap exists between a first portion of sequential ones of the first ply layers and a second gap exists between a second portion of sequential ones of the second ply layers, the first and second gaps being opposite the central grid portion and defined by a thickness of the first and second ply layers, respectively.

20. A method of forming a composite octogrid laminate structure, the method comprising the steps of:
   forming a plurality of first ply layers by sequentially dispensing a plurality of first elongate tapes oriented in a first direction and a plurality of second elongate tapes oriented in a second direction, the second direction being offset from the first direction;
   forming a plurality of second ply layers by sequentially dispensing a plurality of third elongate tapes oriented in the first direction and a plurality of fourth elongate tapes oriented in the second direction; and
   stacking the plurality of first and second ply layers in an alternating fashion so that a first ply layer is intermediate any sequentially stacked second ply layer and vice-versa,
wherein:
   each of the plurality of first, second, third and fourth elongate tapes comprises a first set of ply layers and a second set of ply layers offset from the first set of ply layers by an angle of at least 25 degrees;
   a first end of each of the plurality of first, second, third and fourth elongate tapes is positioned approximately adjacent a midpoint of an adjacently positioned one of the plurality of first, second, third and fourth elongate tapes; and
   a second and opposing end of each of the plurality of first, second, third and fourth elongate tapes extends freely beyond a central grid portion defined by a length of a portion between the first end and the midpoint of a portion of the plurality of first, second, third and fourth elongate tapes.

* * * * *